US012711418B2

(12) United States Patent
Shukla et al.

(10) Patent No.: US 12,711,418 B2
(45) Date of Patent: Aug. 18, 2026

(54) VARIABLE-OUTPUT-SPACE PREDICTION MACHINE LEARNING MODELS USING CONTEXTUAL INPUT EMBEDDINGS

(71) Applicant: Optum, Inc., Minnetonka, MN (US)

(72) Inventors: Abhay Shukla, Uttar Pradesh (IN); Ramprasad Anandam Gaddam, Mumbai (IN); Srinjay Nath, Kolkata (IN); Deepak Singh, Uttar Pradesh (IN)

(73) Assignee: Optum, Inc., Minnetonka, MN (US)

( * ) Notice: Subject to any disclaimer, the term of this patent is extended or adjusted under 35 U.S.C. 154(b) by 907 days.

(21) Appl. No.: 17/660,697

(22) Filed: Apr. 26, 2022

(65) Prior Publication Data

US 2023/0342654 A1 Oct. 26, 2023

(51) Int. Cl.

*G06N 20/00* (2019.01)
*G06F 18/22* (2023.01)
*G06F 18/23213* (2023.01)

(52) U.S. Cl.

CPC ............ *G06N 20/00* (2019.01); *G06F 18/22* (2023.01); *G06F 18/23213* (2023.01)

(58) Field of Classification Search

CPC .... G06N 20/00; G06F 18/22; G06F 18/23213

See application file for complete search history.

(56) References Cited

U.S. PATENT DOCUMENTS 8,452,610 B2 5/2013 Lipner et al.
9,053,222 B2 6/2015 Lynn et al.
9,846,896 B2 12/2017 Shah
10,014,077 B2 7/2018 Moturu et al.
10,192,639 B2 1/2019 Sellars (Continued)

FOREIGN PATENT DOCUMENTS

CA 3007260 A1 7/2019
KR 10-2021-0016667 A 2/2021
WO 2021/247550 A1 12/2021

OTHER PUBLICATIONS

"Finding Consistency in Medicare's Quality Ratings for Dialysis Providers," Healio, Nephrology News & Issues, May 11, 2015, (6 pages), available on the Internet: https://www.healio.com/news/nephrology/20180227/finding-consistency-in-medicares-quality-ratings-f.

(Continued)

*Primary Examiner* — Matthew Ell
*Assistant Examiner* — Humaira Zahin Mauni
(74) *Attorney, Agent, or Firm* — Alston & Bird LLP

(57) ABSTRACT

As described herein, various embodiments of the present invention use an output space refinement machine learning model to filter C of the B candidate predictive associations that are referred to herein as dynamically-preselected candidate predictive associations for each prediction input data object, with every prediction input data object being associated with a different subset of the dynamically-preselected candidate predictive associations, where C is less than B and is in some embodiments typically much less than B. As described in greater detail below, this approach reduces the number of computational operations that need to be performed by a final classification machine learning model (referred to herein as a variable-output-space prediction machine learning model), and leads to substantial computational efficiency advantages relative to naïve implementations.

20 Claims, 10 Drawing Sheets

(56) References Cited

U.S. PATENT DOCUMENTS

| | | | |
|---|---|---|---|
| 10,325,070 | B2 | 6/2019 | Beale et al. |
| 10,353,908 | B1 | 7/2019 | Aella et al. |
| 10,621,534 | B2 | 4/2020 | Ford et al. |
| 10,672,091 | B2 | 6/2020 | Lachs et al. |
| 10,930,398 | B2 | 2/2021 | Jain et al. |
| 11,099,195 | B2 | 8/2021 | Estruch et al. |
| 11,176,444 | B2 | 11/2021 | Wall et al. |
| 12,315,624 | B2 | 5/2025 | Co et al. |
| 2003/0167187 | A1 | 9/2003 | Bua |
| 2008/0133290 | A1 | 6/2008 | Siegrist et al. |
| 2008/0154641 | A1 | 6/2008 | Rulison |
| 2008/0154642 | A1 | 6/2008 | Marble et al. |
| 2010/0070455 | A1 | 3/2010 | Halperin et al. |
| 2010/0235295 | A1 | 9/2010 | Zides et al. |
| 2014/0122100 | A1 | 5/2014 | Fillmore |
| 2015/0332012 | A1 | 11/2015 | Edelson et al. |
| 2017/0116379 | A1 | 4/2017 | Scott et al. |
| 2017/0177814 | A1 | 6/2017 | Abedini et al. |
| 2017/0308671 | A1 | 10/2017 | Bahrami et al. |
| 2018/0018429 | A1* | 1/2018 | Rice ...................... G06F 16/248 |
| 2018/0068083 | A1 | 3/2018 | Cohen et al. |
| 2019/0206575 | A1 | 7/2019 | Batey et al. |
| 2020/0066399 | A1 | 2/2020 | Springer et al. |
| 2020/0227160 | A1 | 7/2020 | Youngblood et al. |
| 2021/0005324 | A1 | 1/2021 | Bostic et al. |
| 2021/0082563 | A1 | 3/2021 | Wingfield et al. |
| 2021/0118574 | A1 | 4/2021 | Peri et al. |
| 2021/0249137 | A1 | 8/2021 | Dil Nahlieli |
| 2022/0188698 | A1 | 6/2022 | Halecky et al. |
| 2023/0018521 | A1* | 1/2023 | Lindy .................... G16H 50/30 |
| 2023/0316345 | A1 | 10/2023 | Shukla et al. |

OTHER PUBLICATIONS

Levin, Scott et al. "Machine-Learning-Based Hospital Discharge Predictions Can Support Multidisciplinary Rounds and Decrease Hospital Length-of-Stay," BMJ Innovations, vol. 7, No. 2, Apr. 1, 2021, (e-Published: Dec. 21, 2020), pp. 414-421.

Shwartz, Michael et al. "Composite Measures of Health Care Provider Performance a Description of Approaches," The Milbank Quarterly, vol. 93, No. 4, Dec. 2015, pp. 788-825, DOI: 10.1111/1468-0009.12165.

Zhang, Yin et al. "iDoctor: Personalized and Professionalized Medical Recommendations Based on Hybrid Matrix Factorization," Future Generation Computer Systems, vol. 66, Nov. 26, 2015, pp. 30-35, DOI: 10.1016/j.future.2015.12.001.

Non-Final Rejection Mailed on Jun. 5, 2025 for U.S. Appl. No. 17/657,217, 79 page(s).

Notice of Allowance and Fees Due (PTOL-85) Mailed on Dec. 16, 2025 for U.S. Appl. No. 17/657,217, 14 page(s).

Zhang, D., et al., "Cold-Start Recommendation Using Bi-Clustering and Fusion for Large-Scale Social Recommender Systems", IEEE Transactions on Emerging Topics in Computing, Jun. 2014, pp. 239-250, IEEE, US.

* cited by examiner

VARIABLE-OUTPUT-SPACE PREDICTION MACHINE LEARNING MODELS USING CONTEXTUAL INPUT EMBEDDINGS

BACKGROUND

Various embodiments of the present invention address technical challenges related to performing predictive data analysis operations and address the efficiency and reliability shortcomings of various existing predictive data analysis solutions, in accordance with at least some of the techniques described herein.

BRIEF SUMMARY

In general, embodiments of the present invention provide methods, apparatus, systems, computing devices, computing entities, and/or the like for performing predictive data analysis operations. For example, as described herein, various embodiments of the present invention use an output space refinement machine learning model to filter C of the B candidate predictive associations that are referred to herein as dynamically-preselected candidate predictive associations for each prediction input data object, with every prediction input data object being associated with a different subset of the dynamically-preselected candidate predictive associations, where C is less than B and is in some embodiments typically much less than B. As described in greater detail below, this approach reduces the number of computational operations that need to be performed by a final classification machine learning model (referred to herein as a variable-output-space prediction machine learning model), and leads to substantial computational efficiency advantages relative to naïve implementations. In this way, various embodiments of the present invention improve the computational efficiency of (i.e., the number of processing operations required for) performing classification of a prediction input data object by generating B classification scores with respect to B candidate predictive associations (e.g., B defined classes), and reduce the amount of computer processing resources needed for performing classification of a prediction input data object by generating B classification scores with respect to B candidate predictive associations.

In accordance with one aspect, a method is provided. In one embodiment, the method comprises: identifying a group of candidate predictive associations, wherein each candidate predictive association is associated with a candidate predictive feature set; generating, using an output space refinement machine learning model and based at least in part on each candidate predictive association feature set and an input profile of a plurality of defined input profiles for a prediction input data object, a dynamically-preselected predictive association subset of the group of candidate predictive associations that comprise a plurality of dynamically-preselected candidate predictive associations; generating, using an isolated input embedding machine learning model and based at least in part on one or more embedding features for the prediction input data object, an isolated N-dimensional input embedding for the prediction input data object; generating, using a contextual input embedding machine learning model and based at least in part on the isolated N-dimensional input embedding, a contextual input embedding for the prediction input data object, wherein: (i) the contextual input embedding machine learning model is configured to generate the contextual input embedding based at least in part on an N-dimensional contextual embedding subspace for the isolated N-dimensional input embedding within an N-dimensional contextual embedding space data object, (ii) the N-dimensional contextual embedding subspace is associated with a subspace geometric shape profile of a plurality of subspace geometric shape profiles, and (iii) model configuration data for the contextual input embedding machine learning model associates each defined input profile to a respective subspace geometric shape profile; generating, using a variable-output-space prediction machine learning model, based at least in part on each candidate predictive association feature set for the dynamically-preselected predictive association subset, the input profile, and the contextual input embedding machine learning model, the variable-output-space prediction, wherein the variable-output-space prediction describes a selected predictive association subset of the plurality of dynamically-preselected candidate predictive associations; and performing one or more prediction-based actions based at least in part on the noted variable-output-space prediction.

In accordance with another aspect, a computer program product is provided. The computer program product may comprise at least one computer-readable storage medium having computer-readable program code portions stored therein, the computer-readable program code portions comprising executable portions configured to: identify a group of candidate predictive associations, wherein each candidate predictive association is associated with a candidate predictive feature set; generate, using an output space refinement machine learning model and based at least in part on each candidate predictive association feature set and an input profile of a plurality of defined input profiles for a prediction input data object, a dynamically-preselected predictive association subset of the group of candidate predictive associations that comprise a plurality of dynamically-preselected candidate predictive associations; generate, using an isolated input embedding machine learning model and based at least in part on one or more embedding features for the prediction input data object, an isolated N-dimensional input embedding for the prediction input data object; generate, using a contextual input embedding machine learning model and based at least in part on the isolated N-dimensional input embedding, a contextual input embedding for the prediction input data object, wherein: (i) the contextual input embedding machine learning model is configured to generate the contextual input embedding based at least in part on an N-dimensional contextual embedding subspace for the isolated N-dimensional input embedding within an N-dimensional contextual embedding space data object, (ii) the N-dimensional contextual embedding subspace is associated with a subspace geometric shape profile of a plurality of subspace geometric shape profiles, and (iii) model configuration data for the contextual input embedding machine learning model associates each defined input profile to a respective subspace geometric shape profile; generate, using a variable-output-space prediction machine learning model, based at least in part on each candidate predictive association feature set for the dynamically-preselected predictive association subset, the input profile, and the contextual input embedding machine learning model, the variable-output-space prediction, wherein the variable-output-space prediction describes a selected predictive association subset of the plurality of dynamically-preselected candidate predictive associations; and perform one or more prediction-based actions based at least in part on the variable-output-space prediction.

In accordance with yet another aspect, an apparatus comprising at least one processor and at least one memory including computer program code is provided. In one embodiment, the at least one memory and the computer program code may be configured to, with the processor, cause the apparatus to: identify a group of candidate predictive associations, wherein each candidate predictive association is associated with a candidate predictive feature set; generate, using an output space refinement machine learning model and based at least in part on each candidate predictive association feature set and an input profile of a plurality of defined input profiles for a prediction input data object, a dynamically-preselected predictive association subset of the group of candidate predictive associations that comprise a plurality of dynamically-preselected candidate predictive associations; generate, using an isolated input embedding machine learning model and based at least in part on one or more embedding features for the prediction input data object, an isolated N-dimensional input embedding for the prediction input data object; generate, using a contextual input embedding machine learning model and based at least in part on the isolated N-dimensional input embedding, a contextual input embedding for the prediction input data object, wherein: (i) the contextual input embedding machine learning model is configured to generate the contextual input embedding based at least in part on an N-dimensional contextual embedding subspace for the isolated N-dimensional input embedding within an N-dimensional contextual embedding space data object, (ii) the N-dimensional contextual embedding subspace is associated with a subspace geometric shape profile of a plurality of subspace geometric shape profiles, and (iii) model configuration data for the contextual input embedding machine learning model associates each defined input profile to a respective subspace geometric shape profile; generate, using a variable-output-space prediction machine learning model, based at least in part on each candidate predictive association feature set for the dynamically-preselected predictive association subset, the input profile, and the contextual input embedding machine learning model, the variable-output-space prediction, wherein the variable-output-space prediction describes a selected predictive association subset of the plurality of dynamically-preselected candidate predictive associations; and perform one or more prediction-based actions based at least in part on the variable-output-space prediction.

BRIEF DESCRIPTION OF THE DRAWINGS

Figure 1:
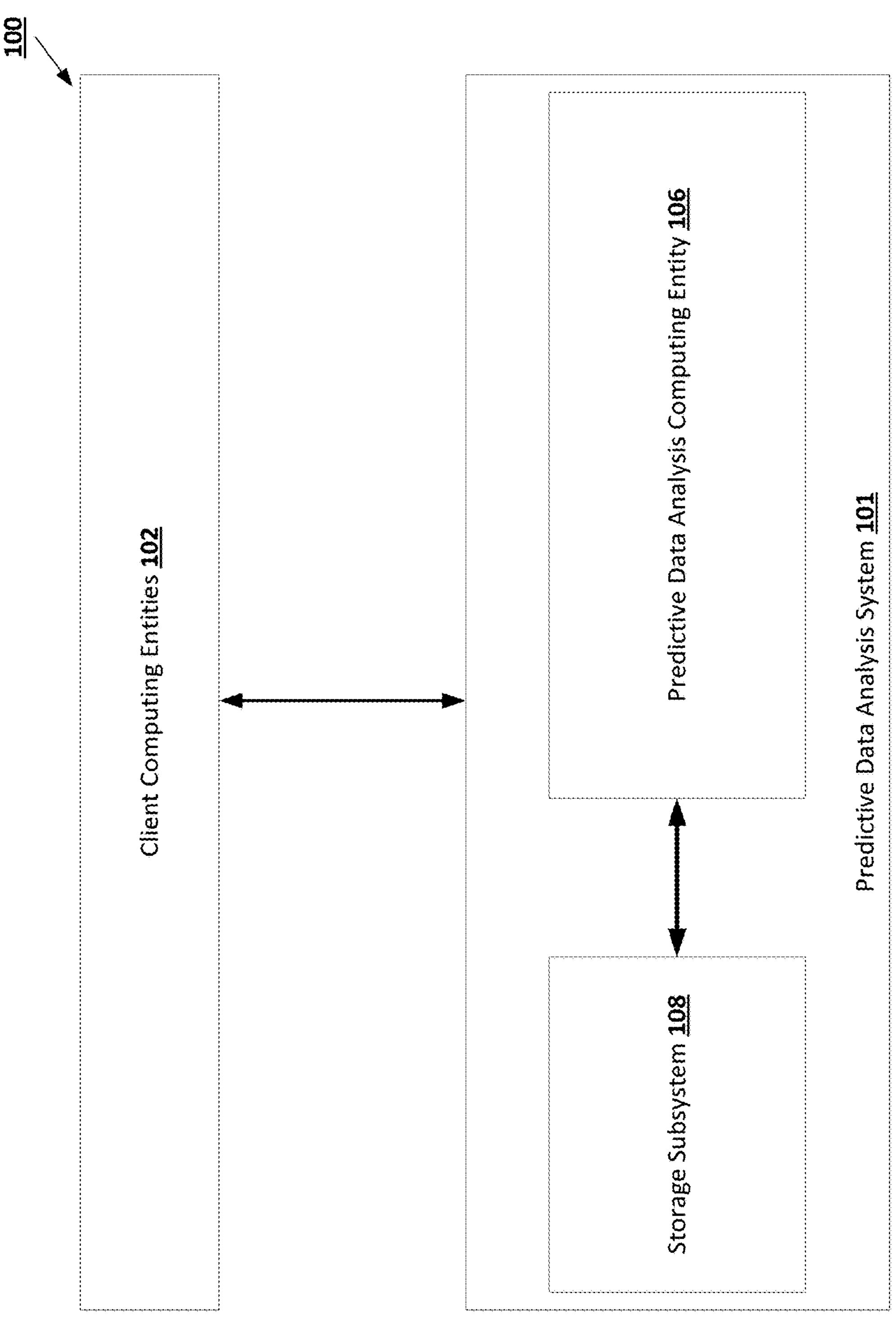

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
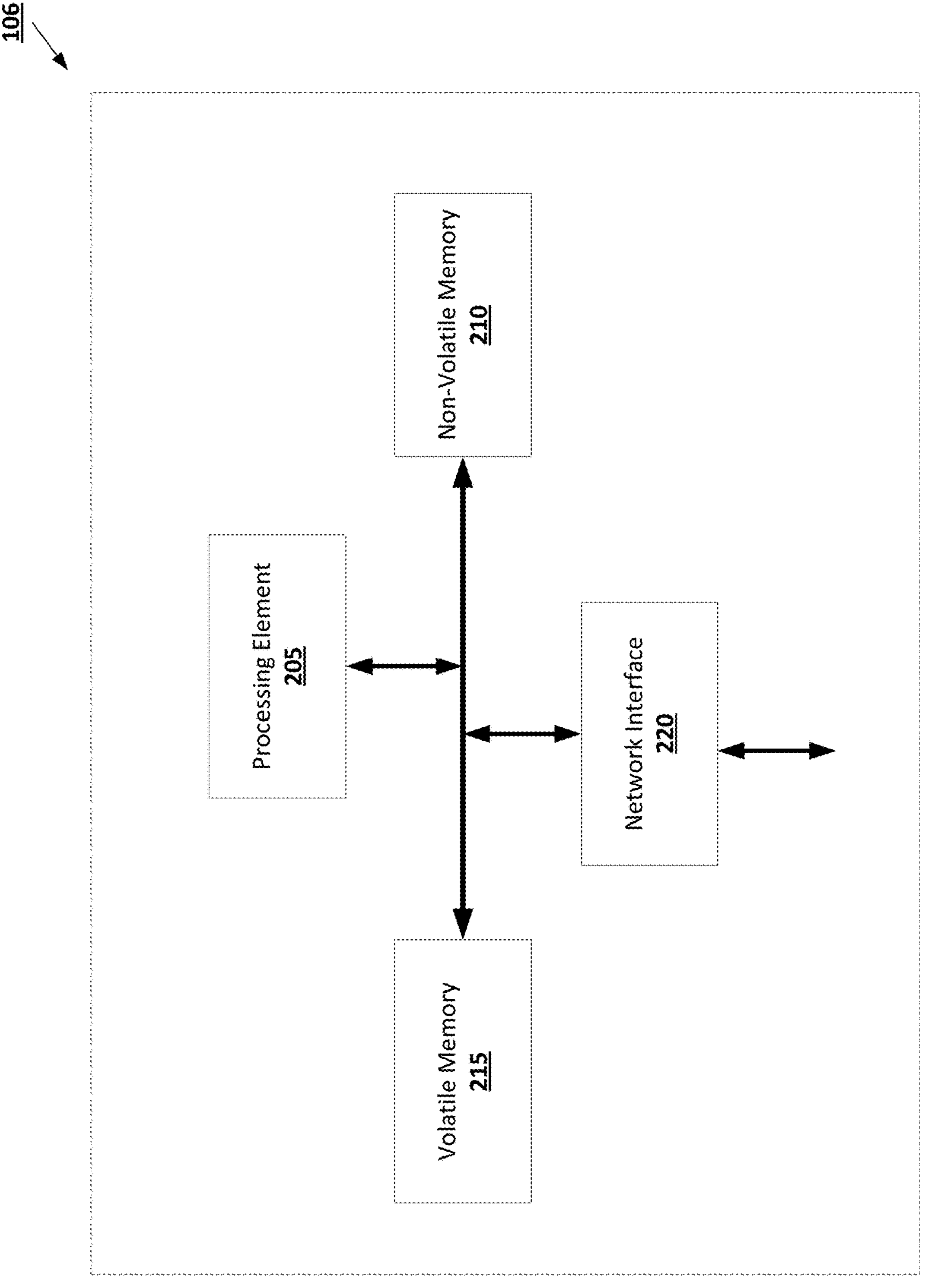

FIG. 2 provides an example predictive data analysis computing entity in accordance with some embodiments discussed herein.

Figure 3:
Figure 3:
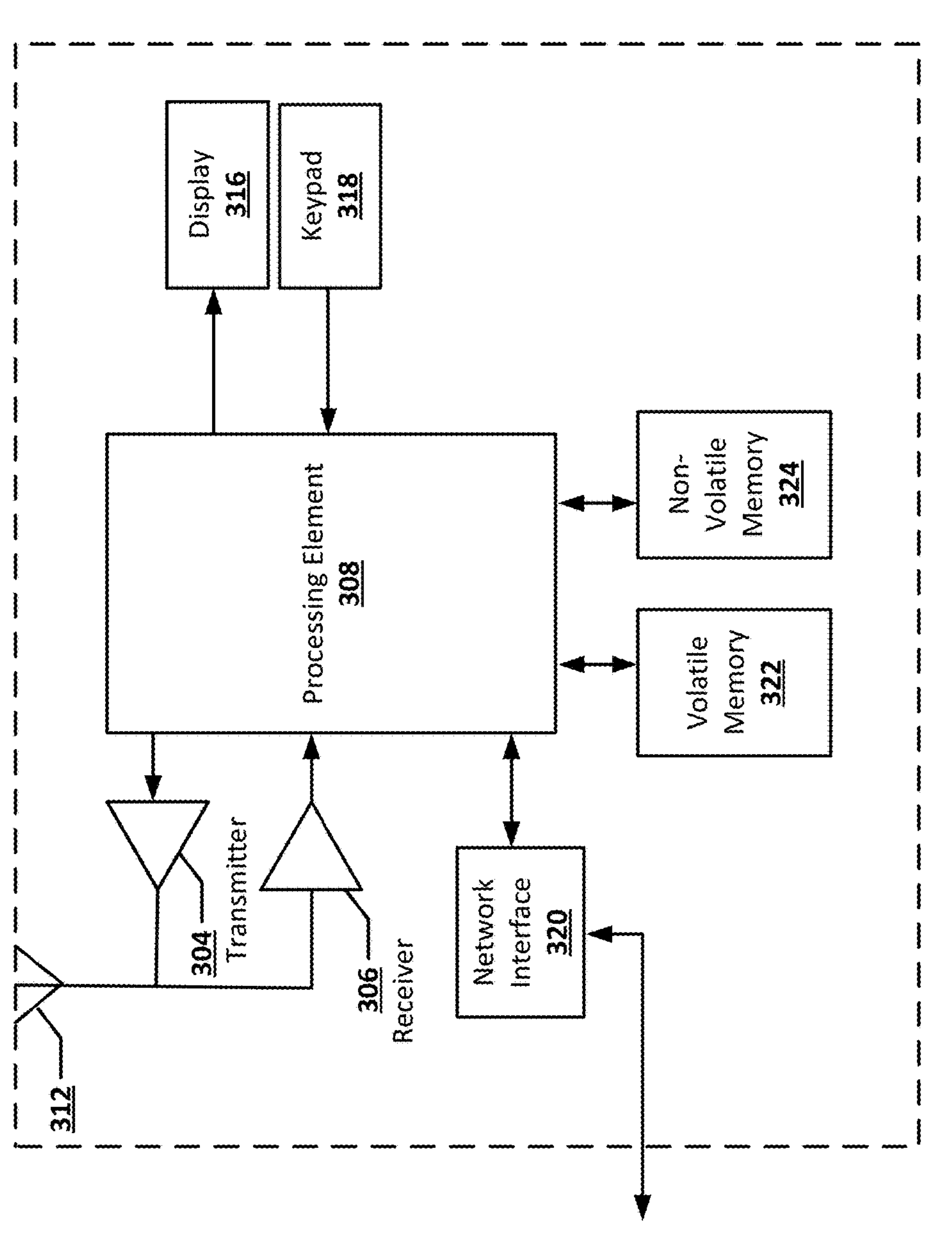

FIG. 3 provides an example client computing entity in accordance with some embodiments discussed herein.

Figure 4:
Figure 4:
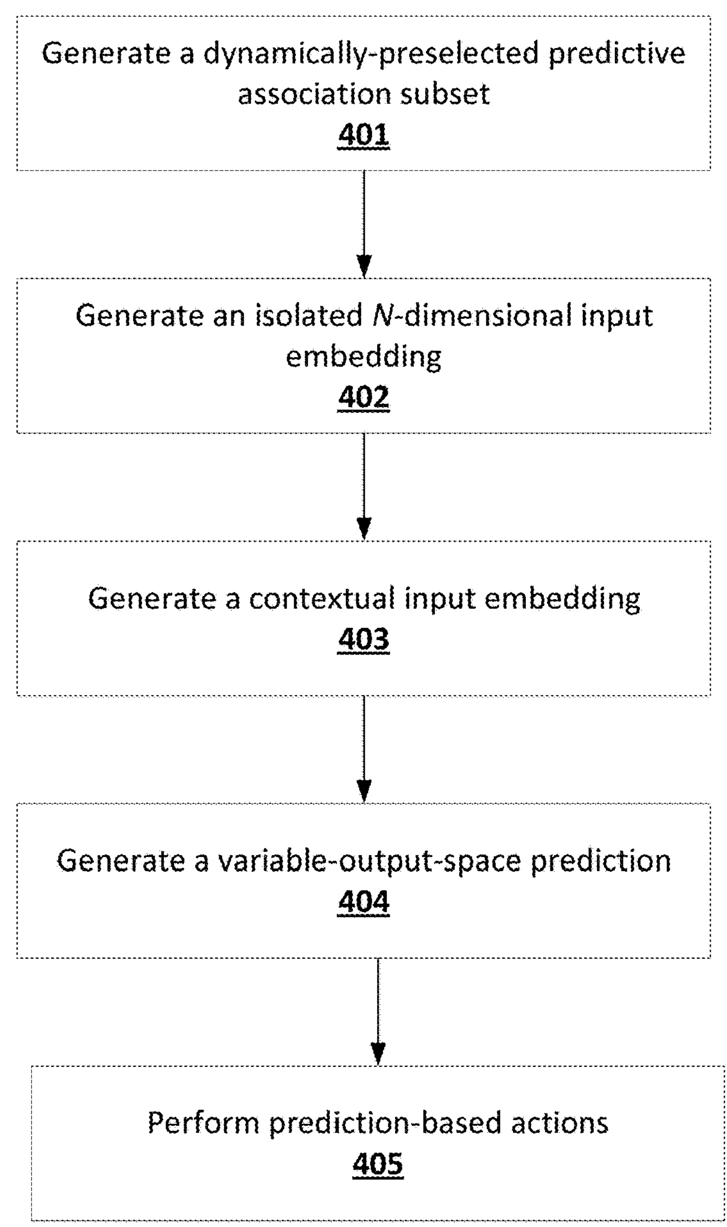

FIG. 4 is a flowchart diagram of an example process for generating a variable-output-space prediction for a prediction input data object in accordance with some embodiments discussed herein.

Figure 5:
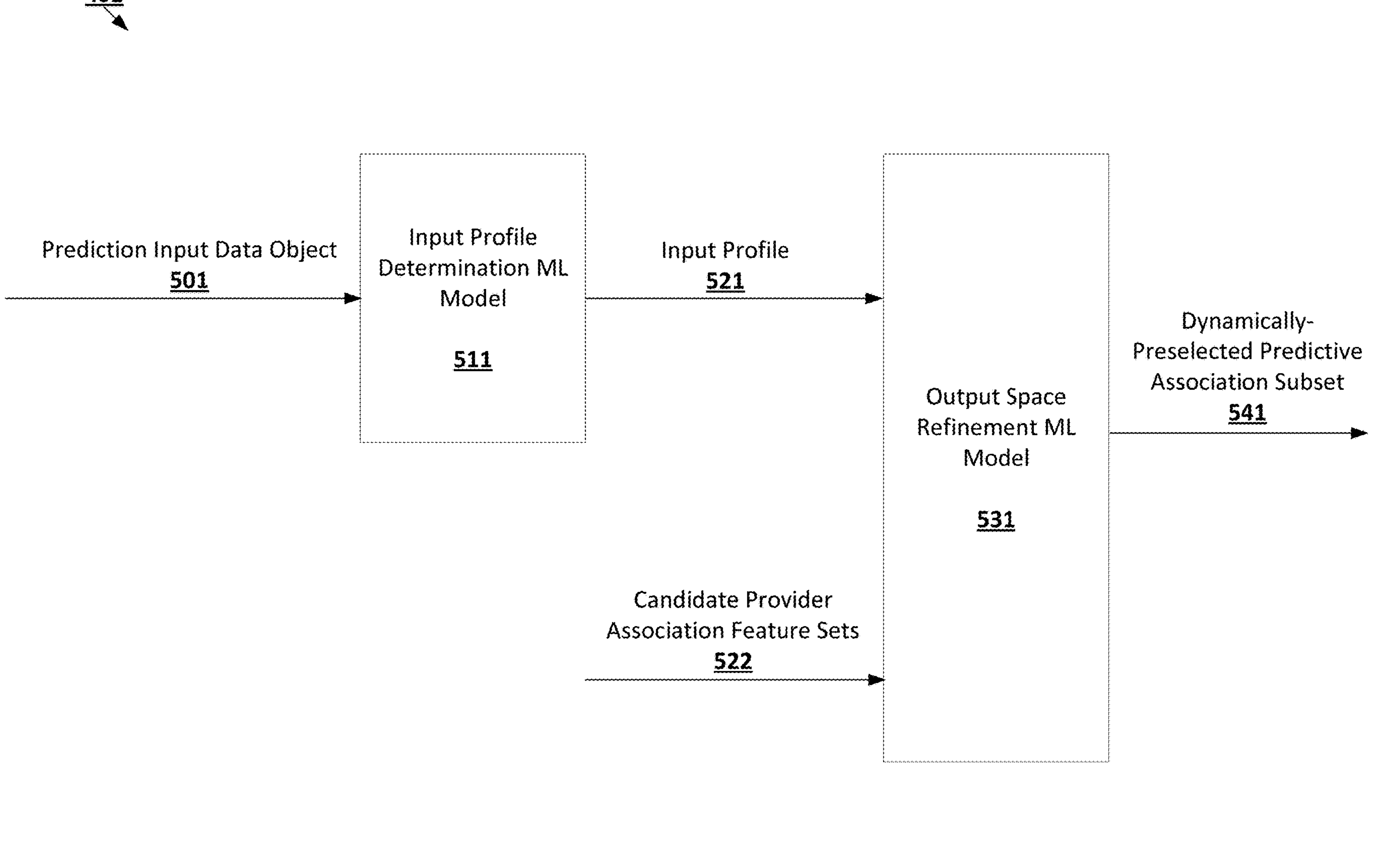

FIG. 5 is a data flow diagram of an example process for generating a dynamically-preselected provider association subset for a prediction input data object in accordance with one or more optimal imbalance adjustment conditions in accordance with some embodiments discussed herein.

Figure 6:
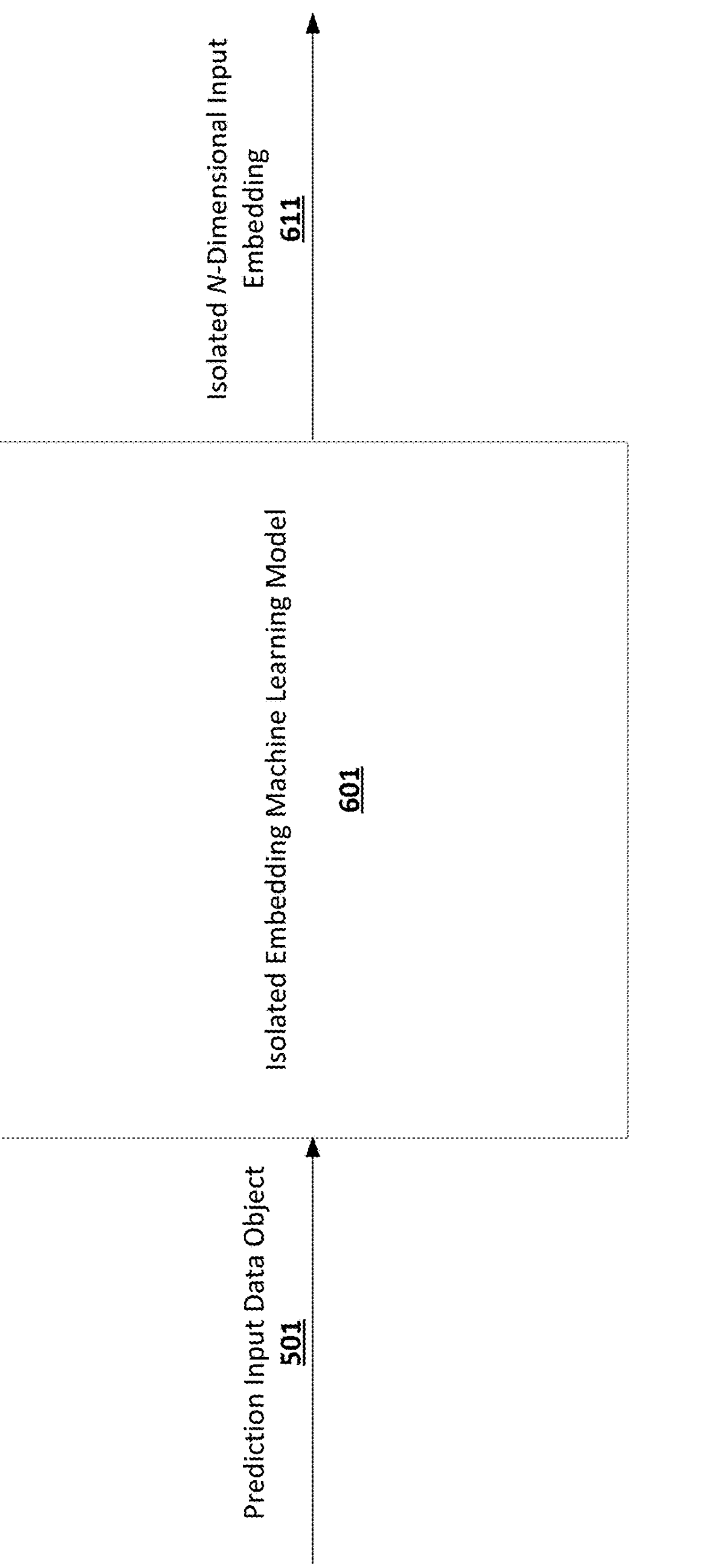

FIG. 6 is a data flow diagram of an example process for generating an isolated N-dimensional input embedding for a prediction input data object in accordance with one or more optimal imbalance adjustment conditions in accordance with some embodiments discussed herein.

Figure 7:
Figure 7:
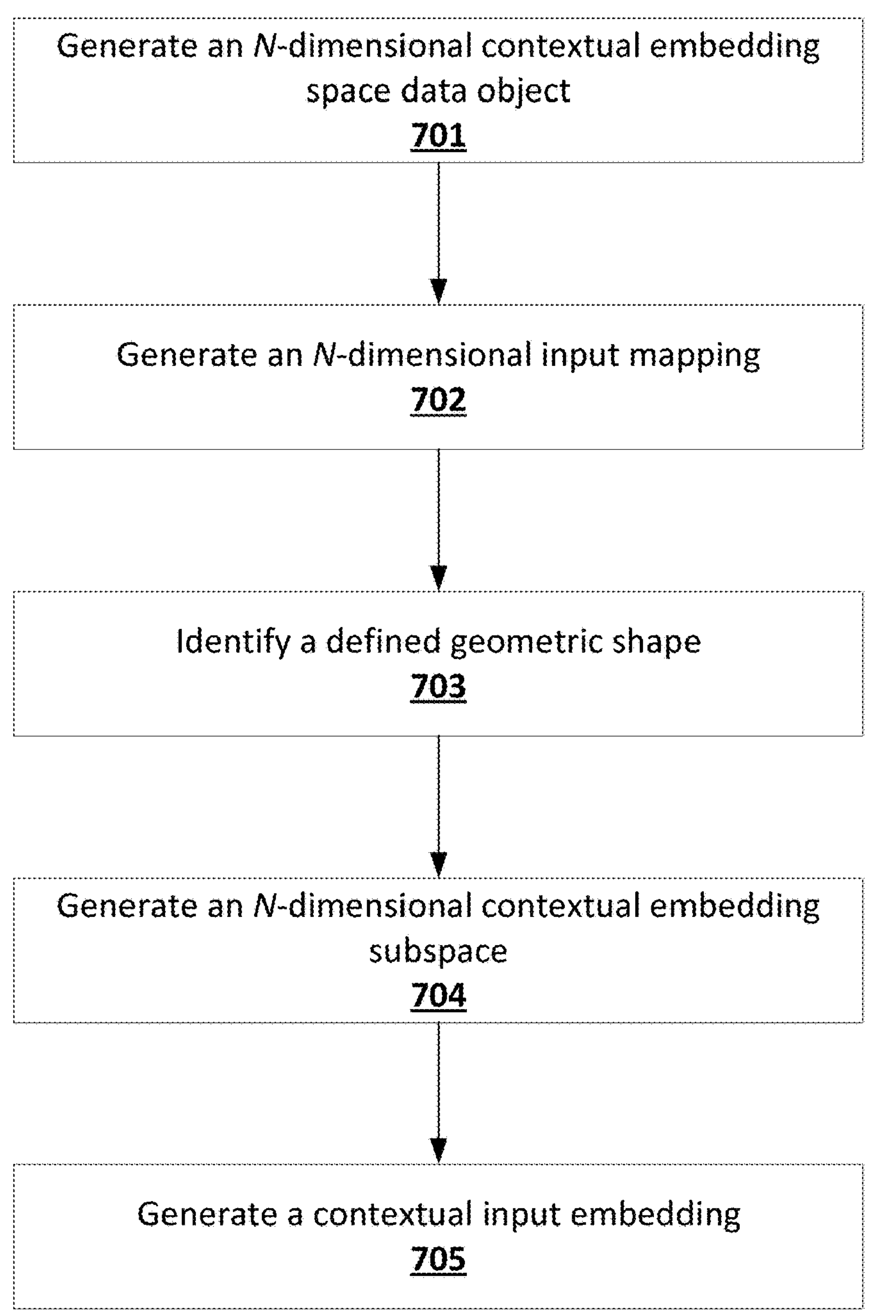

FIG. 7 is a flowchart diagram of an example for generating a contextual input embedding for a prediction input data object using operations of a contextual embedding machine learning model in accordance with one or more optimal imbalance adjustment conditions in accordance with some embodiments discussed herein.

Figure 8:
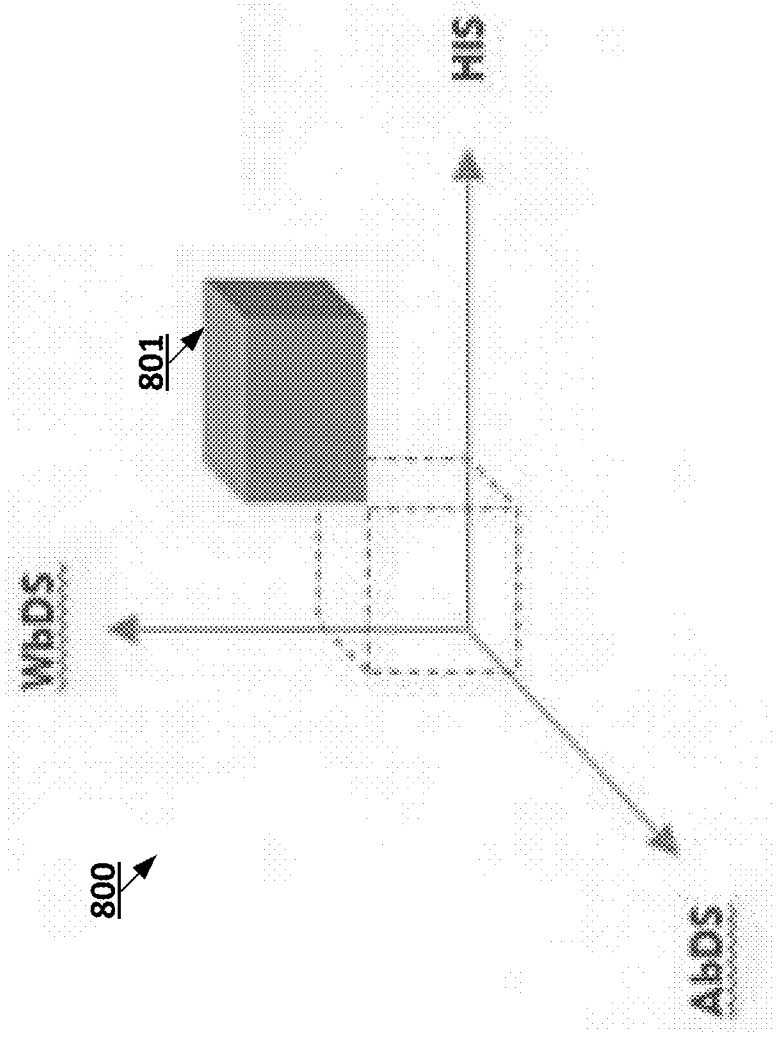

FIG. 8 provides an operational example of an N-dimensional contextual embedding subspace for a prediction input data object in accordance with some embodiments discussed herein.

Figure 9:
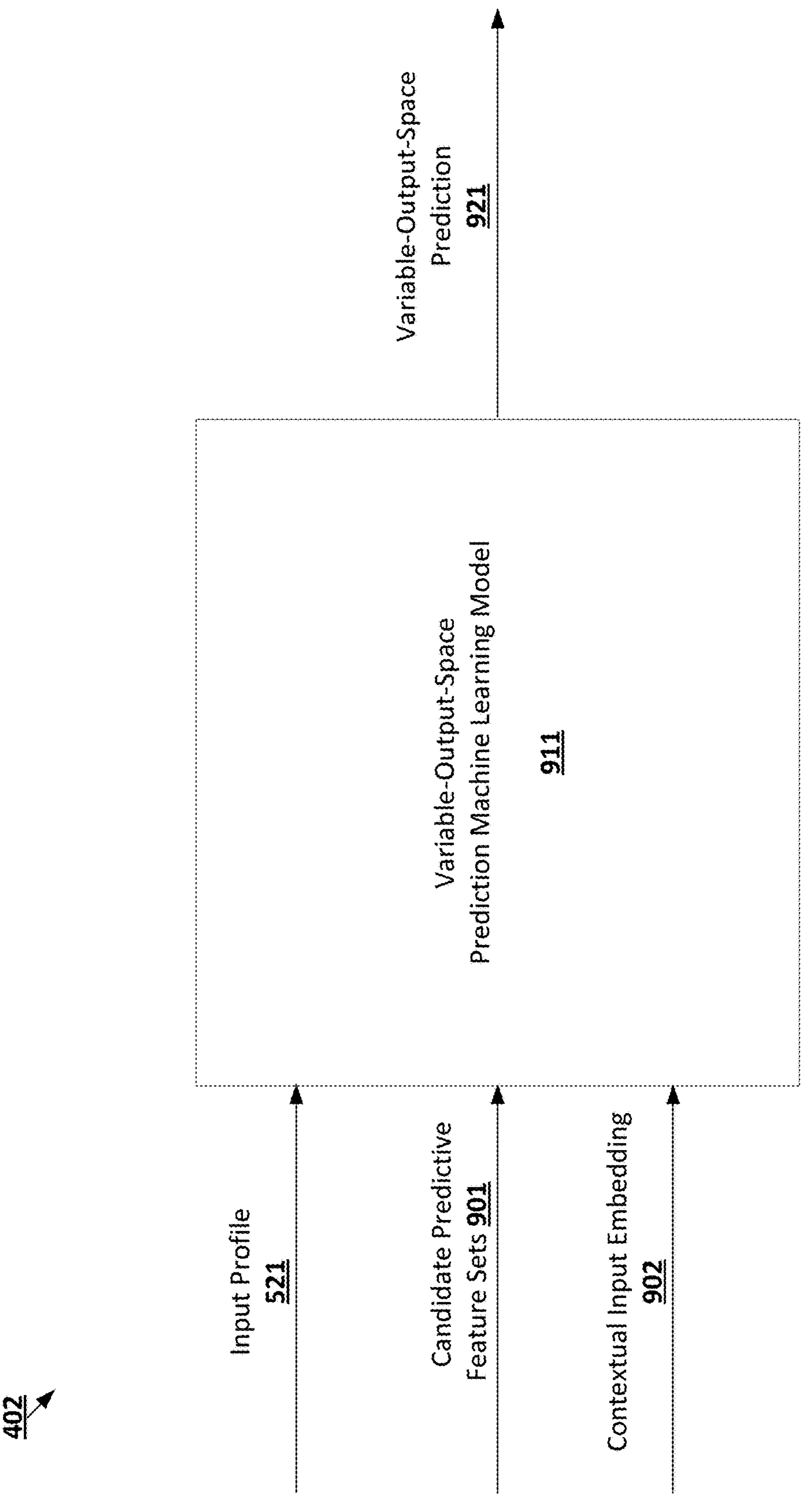

FIG. 9 is a data flow diagram of an example for generating a variable-output-space prediction for a prediction input data object by using a variable-output-space prediction machine learning model in accordance with one or more optimal imbalance adjustment conditions in accordance with some embodiments discussed herein.

Figure 10:
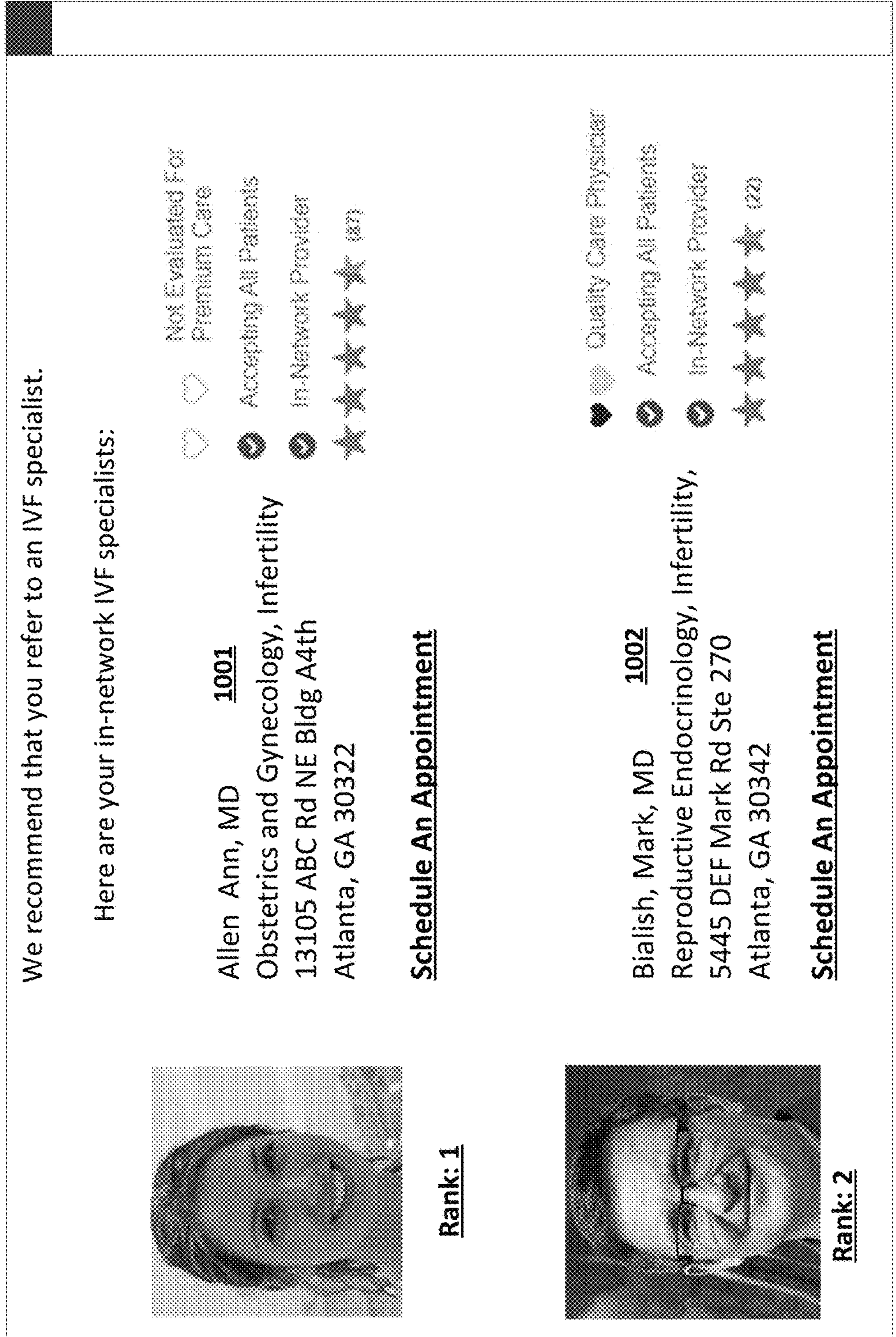

FIG. 10 provides an operational example of a prediction output user interface in accordance with some embodiments discussed herein.

DETAILED DESCRIPTION

Various embodiments of the present invention now will be described more fully hereinafter with reference to the accompanying drawings, in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis tasks.

I. OVERVIEW AND EXEMPLARY TECHNICAL IMPROVEMENTS

Various embodiments of the present invention improve the computational efficiency of (i.e., the number of processing operations required for) performing classification of a prediction input data object by generating B classification scores with respect to B candidate predictive associations (e.g., B defined classes), where B is a large value. To accomplish this technical advantage, the noted embodiments of the present invention use an output space refinement machine learning model to filter C of the B candidate predictive associations that are referred to herein as dynamically-preselected candidate predictive associations for each prediction input data object, with every prediction input data object being associated with a different subset of the dynamically-preselected candidate predictive associations, where C is less than B and is in some embodiments typically much less than B. As described in greater detail below, this approach reduces the number of computational operations that need to be performed by a final classification machine learning model (referred to herein as a variable-output-space prediction machine learning model), and leads to substantial computational efficiency advantages relative to naïve implementations. In this way, various embodiments of the present invention improve the computational efficiency of (i.e., the number of processing operations required for) performing classification of a prediction input data object by generating B classification scores with respect to B candidate predictive associations (e.g., B defined classes), and reduce the amount of computer processing resources needed for performing classification of a prediction input data object by generating B classification scores with respect to B candidate predictive associations.

For example, in some embodiments, the output space refinement machine learning model is configured to process a patient persona for a patient/individual along with feature data associated with B medical providers in order to select a subset of the B medical providers that are deemed to be most suitable for the patient/individual, where the subset includes C medical providers. In this way, because C<B, the output space refinement machine learning model may in some embodiments be useful for a first-level filtering of the medical providers applicable to a patient/individual, where the output of the noted first-level filtering may be used to generate/define the output space of a variable-output-space prediction machine learning model. In other words, in some embodiments, to generate a variable-output-space prediction for a particular patient/individual, instead of generating B prediction scores with respect to B medical providers (where B may be a very large number), the variable-output-space prediction machine learning model may generate C prediction scores with respect to a C-sized subset of the B medical providers containing the most relevant medical providers. Because C<B, this means that the computational complexity of generating B prediction scores using a variable-output-space prediction machine learning model is higher than the computational complexity of generating C prediction scores using the variable-output-space prediction machine learning model, and that this computational complexity gap widens as the gap between B and C increases (e.g., for a fixed C, as B increases).

In some embodiments, the output space refinement machine learning model is a supervised machine learning model that is configured to generate B prediction scores for a prediction input data object with respect to B candidate predictive associations. As described above, the output space refinement machine learning model is configured to define the output space of a variable-output-space prediction machine learning model, where the output space of a machine learning model may describe the range of classes that the machine learning model may assign to a single prediction input. In this way, in some embodiments, the output space refinement machine learning model has a fixed output space (e.g., a fixed output space comprising the B predictive associations) for all prediction input data objects, while the variable-output-space prediction machine learning model has a variable output space for each prediction input data object, where the variable output space of a particular prediction input data object may be determined based at least in part on the classification scores generated by the output space refinement machine learning model via processing the input profile associated with the particular prediction input data object (e.g., via processing a fixed-dimensional representation of the input profile such as a fixed-dimensional embedding of the input profile).

Accordingly, as described above, in some embodiments, an output space refinement machine learning model performs B predictive inferences, while the variable-output-space prediction machine learning model performs C predictive inferences. In some of the noted embodiments, the output space refinement machine learning model either performs much less computationally intensive feature processing operations for each predictive inference, or is much less deeper, or both, such that if the output space refinement machine learning model performs $\alpha$ operations per predictive inference, and the variable-output-space prediction machine learning model performs $\beta$ operations per predictive inference, then $\alpha \ll \beta$. This means that, given a sufficiently large gap between $\alpha$ and $\beta$ the computational complexity of performing operations of the output space refinement machine learning model followed by operations of the variable-output-space prediction machine learning model (i.e., $O(\alpha\beta+\beta C)$) is less than the computational complexity of performing operations of a naïve solution where a single deep machine learning framework performs B predictive inferences (i.e., $O(\beta B)$). In this way, using the combination of an output space refinement machine learning model followed by a variable-output-space prediction machine learning framework improves the computational complexity of performing deep learning with respect to predictive tasks that have a large prediction space (in this case, a large B value).

In some embodiments, at least one of the subspace geometric shape profile of the N-dimensional contextual embedding subspace for a prediction input data object or the geometric measurements of the N-dimensional contextual embedding subspace for a prediction input data object may be determined based at least in part on an input profile of the prediction input data object. In some embodiments, model configuration data for a contextual input embedding machine learning model associates each defined input profile to a respective subspace geometric shape profile. In some embodiments, model configuration data for the contextual input embedding machine learning model associates each defined input profile to one or more defined geometric measurements for the respective subspace geometric shape profile that is associated with the defined input profile. In some embodiments, the defined geometric shape of the N-dimensional contextual embedding subspace for a prediction input data object is determined by mapping the input profile of the prediction input data object to a particular geometric shape having a particular subspace geometric shape profile (i.e., a particular geometric shape type, such as a hypercube geometric shape type, a hyperrectangle geometric shape type, an n-circle geometric shape type, and/or the like) and optionally one or more geometric measurements for the particular subspace geometric shape profile.

For example, given four defined input profiles (e.g., four defined patient personas) $P_1$, $P_2$, $P_3$, and $P_4$, model configuration data for a contextual input embedding machine learning model may define the following: (i) $P_1$ is associated with a hypercube subspace geometric shape profile, (ii) $P_2$ is associated with a hyperrectangle subspace geometric shape profile, (iii) $P_3$ is associated with a hypercube subspace geometric shape profile, and (iv) $P_4$ is associated with a hypercube subspace geometric shape profile. As another example, given four defined input profiles (e.g., four defined patient personas) $P_1$, $P_2$, $P_3$, and $P_4$, model configuration data for a contextual input embedding machine learning model may define the following: (i) $P_1$ is associated with a hypercube subspace geometric shape profile with a side magnitude value of 0.2, (ii) $P_2$ is associated with a hyperrectangle subspace geometric shape profile with a length magnitude value of 0.1 and a width magnitude value 0.3, (iii) $P_3$ is associated with a hypercube subspace geometric shape profile with a radius of 0.15, and (iv) $P_4$ is associated with a hypercube subspace geometric shape profile with a radius of 0.25.

In some embodiments, to enable a variable-output-space prediction machine learning model to learn the complex predictive of task of generating effective predictions across varying output spaces, the input space of the variable-output-space prediction machine learning model may be designed such that the noted input space may also be dynamically adjustable across prediction input data objects. For example, in some embodiments, once generated/detected, an N-dimensional contextual embedding subspace of a particular prediction input data object can be used to generate a contextual input embedding that describes not only feature data about the particular prediction input data object in isolation but also feature data about feature data of potential surrounding/related prediction input data objects of the particular prediction input data object. In some of the noted embodiments, the contextual input embedding is then provided as an input to a variable-output-space prediction machine learning model. Accordingly, in some embodiments, determining geometric properties of the N-dimensional contextual embedding subspace for a prediction input data object based at least in part on the input profile of the prediction input data object enables the variable-output-space prediction machine learning model to have an input that is variable for different prediction input data objects, as different prediction input data objects may have different input profiles and thus different geometric shapes for N-dimensional contextual embedding subspaces and consequently different contextual input embeddings. Thus, in some embodiments, just as the output space of the variable-output-space prediction machine learning model is different for different prediction input data objects, the input space of the variable-output-space prediction machine learning model is also different for different prediction input data objects. In some embodiments, this symmetric variability of the input space and the output space of the variable-output-space prediction machine learning model is key for ensuring effectiveness and training efficiency of the variable-output-space prediction machine learning model.

Moreover, various embodiments of the present invention make substantial technical improvements to performing operational load balancing for the post-prediction systems (e.g., for automated appointment scheduling systems). For example, in some embodiments, a predictive data analysis computing entity determines D predictive scores for D candidate predictive associations based at least in part on a ranking for the D candidate predictive associations as described by a variable-output-space prediction. Then, the count of D candidate predictive associations that are associated with a threshold-satisfying predictive score, along with a resource utilization ratio for each candidate predictive association, can be used to predict a predicted number of computing entities needed to perform post-prediction processing operations with respect to the D candidate predictive associations. For example, in some embodiments, the number of computing entities needed to perform post-prediction processing operations (e.g., automated investigation operations) with respect to D candidate predictive associations can be determined based at least in part on the output of the equation:

$$R = \mathrm{ceil}\left(\sum_{k}^{k=K} ur_k\right),$$

where R is the predicted number of computing entities needed to perform post-prediction processing operations with respect to the D candidate predictive associations, ceil(•) is a ceiling function that returns the closest integer that is greater than or equal to the value provided as the input parameter of the ceiling function, k is an index variable that iterates over K candidate predictive associations among the D candidate predictive associations that are associated with threshold-satisfying predictive scores, and $ur_k$ is the estimated resource utilization ratio for a kth candidate predictive association that may be determined based at least in part on a system complexity of a server system associated with the candidate predictive association. In some embodiments, once R is generated, a predictive data analysis computing entity can use R to perform operational load balancing for a server system that is configured to perform post-prediction processing operations with respect to D candidate predictive associations. This may be done by allocating computing entities to the post-prediction processing operations if the number of currently-allocated computing entities is below R, and deallocating currently-allocated computing entities if the number of currently-allocated computing entities is above R.

In some embodiments, a proposed system: (i) processes disease progression data associated with a patient to generate a disease identification for the patient, (ii) processes the disease identification based at least in part on sensitivity data associated with the patient using N regression models to generate N sensitivity scores, (iii) projects the patient to an N-dimensional space using the N sensitivity scores, (iv) identifies an N-dimensional subspace of the N-dimensional space based at least in part on the N-dimensional projection of the patient, and (iv) processes the N-dimensional subspace along with a patient persona associated with the patient and E provider personas associated with E eligible providers using a provider recommendation machine learning model to assign a predicted ranking to each of the E eligible providers.

An exemplary application of various embodiments of the present invention relates to medical provider ranking/recommendation. Currently, a holistic health profile of a patient is not available and thus patient regional, demographic, past clinical experiences, risk categories, and benchmarks are not provided as part of a comprehensive overview of patient health profile. As such, optimal provider recommendations may not be effectively or accurately determined for the patient. As such, a holistic three-dimensional treatment profiler may generate a comprehensive treatment profile. The holistic three-dimensional treatment profiler may determine scores that are associated with a patient dimension, a provider dimension, and a health sensitivity dimension, and then aggregate the individual scores to generate a recommended list of providers for a patient. In some embodiments, a provider recommendation machine learning model may employ a patient dimension machine learning framework, a provider dimension machine learning framework, and a health sensitivity machine learning framework to generate a provider recommendation score for a subset of selected candidate providers to effectively and accurately provide a patient with one or more recommended providers. The patient dimension machine learning framework may determine a persona categorization for a patient based at least in part on associated patient features and assign a specific patient persona category to the patient. Associated patient features may include demographic and behavioral traits, economic and social determinants, and a historical chronic profile associated with the patient. The patient dimension machine learning framework may be trained using unsupervised learning. As the input features of the patient dimension machine learning framework are dynamic in nature, patient persona profiles may be updated on a periodic basis such that the patient persona for the patient is accurate and up-to-date.

The provider dimension machine learning framework may determine a provider category for each provider of a plurality of providers. The provider dimension machine learning framework may determine the provider category based at least in part on associated provider features such as education, specialty, treatment experience and preferences. The health sensitivity machine learning framework may generate a health sensitivity score for the patient. The health sensitivity score may be indicative of the patient's immediate health and historical health status, family heredity, progression of relevant health conditions based at least in part on associated DNA/RNA sequencing. In some embodiments, the health sensitivity machine learning framework may determine a health sensitivity score for one or more health sensitivity measures. The health sensitivity measures may include a regional health sensitivity determination, a clinical health sensitivity determination, and a genetic health sensitivity determination. The regional health sensitivity determination may consider locational factors for the patient such as pollution, temperature, altitude, etc., where each locational factor may affect a patient's health. A clinical health sensitivity determination may consider a patient's risk for certain diseases based at least in part on his/her family history of relevant diagnoses and progression of health. A genetic health sensitivity determination may consider the transcriptional effects of genome variation using a patients DNA and/or RNA sequence and publicly available genome-wide association studies (GWAS).

In particular, the health sensitivity machine learning framework may generate a health sensitivity score using the following equation:

$$\psi_{m,A} = f\left(m, A, P_A, \left\langle (D_j)_{j=1}^{N_A} \right\rangle_{t-g_A}^{t}\right),$$

where $\psi_{m,A}$ is the health sensitivity score as a function of $f$. The function $f$ takes in the parameters m which is the measure under consideration (e.g., regional health sensitivity dimension, clinical health sensitivity dimension, or genetic sensitivity dimension), A is the patient under consideration, $P_A$ is the patient persona assigned to patient A, $$\left\langle (D_j)_{j=1}^{N_A} \right\rangle_{t-g_A}^{t}$$

is the sequence of recent and relevant diagnoses for patient A from a time $(t-g_A)$ to t (where t is the current time of interest, $g_A$ is the time period in which a sequence of diseases are considered, and $(t-g_A)$ defines an initial time of interest), and $N_A$ is the length of sequence of recent and relevant diagnoses for patient A. The health sensitivity score may be indicative of correlations between health condition of a patient, gene sequences of the patient, and a health outcome (e.g., probability of hospital admission, probability of emergency visit, probably length of hospital stay, etc.) for the patient.

In some embodiments, the health sensitivity machine learning framework may comprise: (i) N (e.g., eight) regression models that are each configured to process input data for a patient including disease progression data, disease identification data performed based at least in part on disease progression data, regional sensitivity data, hereditary sensitivity data, genetic research data, and health inequity data to generate a health sensitivity dimension score of N health sensitivity dimension scores; and (ii) a model that is configured to project a patient on an 8-dimensional plane based at least in part on the N health sensitivity dimension scores associated with the patient and determine an 8-dimensional subspace of the 8-dimensional plane that is associated with the projection of the patient.

The provider recommendation machine learning model may generate a recommended provider data object indicative of one or more recommended providers for a particular patient. The provider recommendation machine learning model may determine an intermediate patient provider matching subset, which is a subset of providers from a plurality of candidate providers. The intermediate patient provider matching subset may exclude providers who lack experience in treating a patient chief complaint. The patient provider matching data object may be determined using the following equation:

$$P_{A,C} = U_{i=1}^{N_A} EX_{C,i} * P_i.$$

In this equation, $P_{A,C}$ is a subset of candidate providers as determined for a patient persona A with a chief complaint C. The function $EX_{C,i}$, is the identity function for experience of a provider i in treating a chief complaint C, $P_i$ is the patient persona, and $N_A$ is the total number of candidate providers for patient A. The provider recommendation machine learning model may generate a provider outcome measure for each provider in the patient provider matching subset based at least in part on the health sensitivity score for the patient. The provider recommendation machine learning model may then generate a provider recommendation score for each provider included in the patient provider matching subset based at least in part on the provider outcome measure. The provider recommendation score may be a value between 0 and 5. The provider recommendation machine learning model may in some embodiments generate a provider recommendation data object which describes a relative ranking of suitable providers (e.g., top D providers, providers who satisfy a particular provider recommendation score, etc.) based at least in part on the provider recommendation score for the provider and a proximity of the provider to a patient. In some embodiments, the provider recommendation machine learning model is a regression model that is configured to assign a ranking to each of a set of E eligible providers based at least in part on the patient persona, the provider personas, and feature data associated with the eight-dimensional subspace associated with the patient.

II. DEFINITIONS

The term "prediction input data object" may refer to a data construct that describes feature data associated with a predictive entity (e.g., any real-world entity and/or virtual entity) with respect to which one or more predictive data analysis operations are performed in order to generate a respective prediction. An example of a predictive entity is an individual, such as a health insurance plan member and/or a patient. In some embodiments, a prediction input data object describes at least one of the following for a predictive entity that is associated with the prediction input data object: initial input features and embedding feature sets. In some embodiments, an initial input feature of a predictive entity is any feature of the predictive entity that can be used to generate/select an input profile for the predictive entity. Examples of such initial input features include demographic data, healthcare history data, behavioral attribute data, and/or the like. In some embodiments, an embedding feature of a predictive entity is any feature of the predictive entity that can be used to generate an isolated input embedding for the predictive entity. Examples of such embedding features include one or more automatically-selected disease conditions (e.g., one or more automatically-selected rare disease conditions, one or more automatically-selected rare disease conditions that are selected using one or more rare disease selection machine learning models, and/or the like), one or more manually-selected disease conditions (e.g., one or more manually-selected disease conditions, one or more regional sensitivity features (e.g., one or more features describing at least one spiritual awareness, social awareness, area walkability, air pollution, water pollution, eating habits, and/or the like), one or more hereditary attributes, one or more relevant genetic research attributes, one or more regional health inequity attributes (e.g., one or more features describing at least one of regional life expectancy, regional access to care, preventable death statistics, and/or the like), and/or the like.

The term "candidate predictive association" may refer to a data construct that describes a real-world entity and/or a virtual entity that can be mapped to a predictive entity. For example, when a predictive entity describes an individual, the candidate predictive associations may be providers (e.g., medical providers) that may be mapped to (e.g., recommended for) the individual and/or recommended for the individual. In some embodiments, a candidate predictive association is associated with a set of features that are described by a candidate predictive association feature set for the candidate predictive association. Examples of candidate prediction association features include at least one of demographic features, experience features, expertise features, patient engagement quality features, and/or the like. In some embodiments, the candidate prediction association features for a particular candidate predictive association include historical engagement measures for the particular candidate predictive association with respect to a set of input profiles. For example, a historical engagement measure may describe a number of past patients/individuals associated with a patient/individual profile that a particular medical provider has serviced in the past, where the patient/individual profile corresponds to the input profile associated with the historical engagement measure and the particular medical provider corresponds to the candidate predictive association associated with the historical engagement measure. As another example, a historical engagement measure may describe what ratio of past patients of a particular medical provider were in the past patients/individuals associated with a patient/individual profile, where the patient/individual profile corresponds to the input profile associated with the historical engagement measure and the particular medical provider corresponds to the candidate predictive association associated with the historical engagement measure.

The term "input profile determination machine learning model" may refer to a data construct that describes parameters, hyper-parameters, and/or defined operations of a machine learning model that is configured to process one or more initial input features of a prediction input data object to select an input profile for the prediction input data object from a set of defined A input profiles. In some embodiments, the input profile determination machine learning model is a supervised machine learning model that is configured to process the initial input features of the prediction input data object to generate a set of A classification scores, where each classification score describes a computed/predicted likelihood that the prediction input data object is associated with a corresponding input profile of the defined input profiles, and where the input profile for the prediction input data object may be the defined input profile having the highest classification score. In some embodiments, the input profile determination machine learning model is configured to generate A distance measures with respect to A input clusters, where each distance measure describes a measure of distance of an initial input feature set describing the initial input features of the prediction input data object with respect to a centroid of a respective input cluster that is associated with a respective defined input profile, where the input profile for the prediction input data object may be the defined input profile whose respective input cluster has the lowest distance measure. In some embodiments, inputs to an input profile determination machine learning model include a feature vector describing a set of initial input features of a prediction input data object. In some embodiments, outputs of an input profile determination machine learning model comprise at least one of the following: (i) a vector and/or an atomic value describing a selected input profile for the prediction input data object, (ii) a vector describing A classification scores for the prediction input data object with respect to A defined input profiles, (iii) a vector describing A distance measures for the prediction input data object with respect to A defined input profiles (e.g., with respect to A input clusters of the A defined input profiles). In some embodiments, when the input profile determination is a supervised machine learning framework, the input profile determination machine learning model is trained based at least in part on ground-truth data describing historical input profiles for a set of historical prediction input data objects (e.g., historical patient profiles for a set of past patients as determined by a subject matter expert routine and/or as designated by the past patients).

The term "input clustering machine learning model" may refer to a data construct that describes parameters, hyper-parameters, and/or defined operations of a machine learning model that is configured to: (i) identify a set of historical prediction input data objects (e.g., a set of past patients), (ii) for each historical prediction input data object, generate an M-dimensional feature vector that describes the initial input features of the historical prediction input data object, (iii) map each M-dimensional feature vector an M-dimensional space data object that describes an M-dimensional input mapping for each historical prediction input data object, (iv) process the M-dimensional space data object using a clustering routine (e.g., a k-means clustering routine) to generate a set of A input clusters that comprises a subset of the M-dimensional input mappings for a corresponding subset of the historical prediction input data objects, and (v) assign each input cluster to a respective defined input profile. Accordingly, in some embodiments, the input clustering machine learning model generates a set of A defined input profiles each corresponding to an input cluster of the A input clusters generated by the input clustering machine learning model. In some embodiments, once the input clustering machine learning model generates A input clusters associated with A defined input profiles, the input profile determination machine learning model can use the A input clusters to determine A distance measures for a prediction input data object by using the following operations: (i) generate an M-dimensional input mapping for the prediction input data object in the M-dimensional space data object based at least in part on the initial input features for the prediction input data object, and (ii) for each defined input profile that is associated with a respective input cluster, determine a distance measure (e.g., a Euclidean distance measure) in the M-dimensional space data object between the M-dimensional input mapping of the prediction input data object and an M-dimensional point of the M-dimensional space data object that describes positioning of the respective input cluster within the M-dimensional mapping data object (e.g., an M-dimensional point corresponding to a centroid measure for the respective cluster). In some embodiments, inputs to an input clustering machine learning model comprise a set of feature vectors comprising a feature vector for each historical prediction input data object that describes initial input features associated with the historical prediction input data object. In some embodiments, outputs of an input clustering machine learning model include a vector describing centroid points for A input clusters generated by the input clustering machine learning model. In some embodiments, outputs of an input clustering machine learning model comprise A vectors each associated with an input cluster generated by the input clustering machine learning model and describing cluster features of the noted cluster. In some embodiments, A is defined by a hyper-parameter of the input clustering machine learning model.

The term "defined input profile" may refer to a data construct that describes a categorization that can be assigned to a prediction input data object based at least in part on feature data associated with the prediction input data object. An example of a defined input profile is a patient persona that can be assigned to a prediction input data object for a patient/individual predictive entity based at least in part on patient/individual attributes associated with the noted prediction input data object. In some embodiments, a set of A defined input profiles are generated by clustering a set of historical prediction input data objects into a set of A input clusters and then assigning each input cluster to a defined input profile. In some embodiments, once A defined input profiles are generated, a particular input profile of the A defined input profiles may be assigned to a prediction input data object if at least one of the following conditions is satisfied: (i) the classification score for the defined input profile with respect to the prediction input data object is the highest classification score of A classification scores associated with the prediction input data object, and (ii) the distance measure for the defined input profile with respect to the prediction input data object is the lowest distance measure for the defined input profile with respect to the prediction input data object.

The term "output space refinement machine learning model" may refer to a data construct that describes parameters, hyper-parameters, and/or defined operations of a machine learning model that is configured to select a dynamically-preselected predictive association subset for a prediction input data object. In some embodiments, the output space refinement machine learning model is a classification machine learning model that is configured to generate, for each of B candidate predictive associations, a classification score, where C of the B candidate provider associations having highest classification scores are selected as the dynamically-preselected predictive association subset for the prediction input data object. In some embodiments, C is a hyper-parameter of the output space refinement machine learning model. In some embodiments, the output space refinement machine learning model is configured to generate/select the dynamically-preselected predictive association subset for a prediction input data object based at least in part on the input profile for the prediction input data object and/or feature data associated with the B candidate predictive associations. For example, in some embodiments, the output space refinement machine learning model is configured to process a patient persona for a patient/individual along with feature data associated with B medical providers in order to select a subset of the B medical providers that are deemed to be most suitable for the patient/individual, where the subset includes C medical providers. In some embodiments, the output space refinement machine learning model is a supervised machine learning model that is configured to generate B prediction scores for a prediction input data object with respect to B candidate predictive associations. In some embodiments, inputs to an output space refinement machine learning model comprises B+1 vectors, including B vectors describing B candidate predictive association feature sets for B candidate predictive associations, and one vector describing feature data associated with an input profile of a prediction input data object. In some embodiments, outputs of an output space refinement machine learning model comprise at least one of the following: (i) a vector describing B classification scores for B candidate predictive associations with respect to the prediction input data object, (ii) a vector describing identifiers of C candidate predictive associations that have the highest classification scores for the candidate predictive association with respect to the prediction input data object (e.g., that are in the dynamically-preselected predictive association subset for the prediction input data object), and (iii) C vectors each describing feature data (e.g., a fixed-dimensional representation, a candidate provider association feature set, and/or the like) for a respective candidate predictive association of C candidate predictive associations that have the highest classification scores for the candidate predictive association with respect to the prediction input data object (e.g., that are in the dynamically-preselected predictive association subset for the prediction input data object). In some embodiments, the output space refinement machine learning model is trained using ground-truth data that describe, for each historical prediction input data object (e.g., for each past/observed patient/member/individual), C candidate predictive associations that have the highest historical correlation scores (e.g., C medical providers that have the highest visitation/satisfaction ratios/scores based at least in part on historical visitation/satisfaction data) with respect to the historical prediction input data object.

The term "isolated embedding machine learning model" may refer to a data construct that describes parameters, hyper-parameters, and/or defined operations of a machine learning model that is configured to process one or more embedding features of a prediction input data object to generate an isolated N-dimensional input embedding for the prediction input data object. In some embodiments, the isolated embedding machine learning model is configured to generate a fixed-dimensional representation of the prediction input data object that is determined based at least in part on feature data about the prediction input data object without incorporating predictive insights about feature data of potential prediction input data objects that are deemed related to (e.g., similar to) the target prediction input data object. In some embodiments, the isolated embedding machine learning model comprises N machine learning sub-models (e.g., N regression machine learning models), where the N machine learning sub-models may have a common/shared input (e.g., may all process the same embedding features of the prediction input data object) to generate one of the N dimensional regression outputs described by the isolated N-dimensional input embedding for the prediction input data object. In some embodiments, each machine learning sub-model of the isolated input embedding machine learning model (e.g., each regression machine learning sub-model of the isolated input embedding machine learning model) is configured to generate a dimensional regression output for the prediction input data object based at least in part on a shared embedding feature set that is determined based at least in part on the one or more embedding features for the prediction input data object, where the shared embedding feature set may describe at least a subset of the embedding features associated with the prediction input data object. In some embodiments, inputs to the isolated input embedding machine learning model comprise a vector describing the embedded features of the prediction input data object. In some embodiments, outputs of the isolated input embedding machine learning model comprise an N-sized vector describing the isolated N-dimensional input embedding for the prediction input data object. In some embodiments, the isolated input embedding machine learning model is trained using ground-truth scores, such as ground-truth scores determined based at least in part on historical data associated with historical prediction input data objects (e.g., ground-truth sensitivity designations/scores for past patients/members determined based at least in part on patient/member health history data) and/or ground-truth scores determined based at least in part on subject-matter-expert designations/scores (e.g., ground-truth sensitivity designation/scores determined based at least in part on medical expert feedback regarding a particular patient/member).

The term "isolated N-dimensional input embedding" may refer to a data construct that describes a fixed-size representation of a corresponding prediction input data object. In some embodiments, each of the N values described by an isolated N-dimensional input embedding is generated by a machine learning sub-model (e.g., a regression machine learning sub-model) of the isolated N-dimensional embedding based at least in part on the embedding features associated with the prediction input data object. For example, given N=8, the isolated embedding machine learning may comprise: a machine learning sub-model that is configured to process the embedding features of a prediction input data object to generate a water borne disease sensitivity score for the prediction input data object, a machine learning sub-model that is configured to process the embedding features of a prediction input data object to generate an air borne disease sensitivity score for the prediction input data object, a machine learning sub-model that is configured to process the embedding features of a prediction input data object to generate a health-inequity-based sensitivity score for the prediction input data object, a machine learning sub-model that is configured to process the embedding features of a prediction input data object to generate an environment-based disease sensitivity score for the prediction input data object, a machine learning sub-model that is configured to process the embedding features of a prediction input data object to generate a digital-usage-based disease sensitivity score for the prediction input data object, a machine learning sub-model that is configured to process the embedding features of a prediction input data object to generate a gene-based disease sensitivity score for the prediction input data object, a machine learning sub-model that is configured to process the embedding features of a prediction input data object to generate an in-home supportive care sensitivity score for the prediction input data object, and a machine learning sub-model that is configured to process the embedding features of a prediction input data object to generate a lifestyle-based disease sensitivity score for the prediction input data object.

The term "contextual input embedding machine learning model" may refer to a data construct that describes parameters, hyper-parameters, and/or defined operations of a machine learning model that is configured to generate a contextual input embedding for a prediction input data object based at least in part on an isolated N-dimensional input embedding for the prediction input data object. In some embodiments, to generate the contextual input embedding for a prediction input data object, the contextual embedding machine learning model performs the following operations: (i) mapping the isolated N-dimensional input embedding for the prediction input data object to an N-dimensional contextual embedding space data object, (ii) detecting an N-dimensional contextual embedding subspace of the N-dimensional contextual embedding space data object for the prediction input data object that includes an area within the N-dimensional contextual embedding space data object that is associated with a geometric shape with a subspace geometric shape profile (e.g., a hypercube profile) with defined geometric measurements (e.g., with a defined side measurement value) that is centered at the mapping of the isolated N-dimensional input embedding, and (iii) generating the contextual input embedding based at least in part on one or more detected geometric properties of the N-dimensional contextual embedding subspace. In some embodiments, inputs to the contextual input embedding machine learning model comprise a vector describing the isolated N-dimensional input embedding for a prediction input data object, while outputs of the contextual input embedding machine learning model comprise a vector describing the contextual input embedding for the prediction input data object.

The term "contextual input embedding" may refer to a data construct that describes not only feature data about a particular prediction input data object in isolation but also feature data about feature data of potential surrounding/related prediction input data objects of the particular prediction input data object. In some embodiments, once generated/detected, an N-dimensional contextual embedding subspace of a particular prediction input data object can be used to generate a contextual input embedding that describes not only feature data about the particular prediction input data object in isolation but also feature data about feature data of potential surrounding/related prediction input data objects of the particular prediction input data object. In some of the noted embodiments, the contextual input embedding is then provided as an input to a variable-output-space prediction machine learning model. Accordingly, in some embodiments, determining geometric properties of the N-dimensional contextual embedding subspace for a prediction input data object based at least in part on the input profile of the prediction input data object enables the variable-output-space prediction machine learning model to have an input that is variable for different prediction input data objects, as different prediction input data objects may have different input profiles and thus different geometric shapes for N-dimensional contextual embedding subspaces and consequently different contextual input embeddings. Thus, in some embodiments, just as the output space of the variable-output-space prediction machine learning model is different for different prediction input data objects, the input space of the variable-output-space prediction machine learning model is also different for different prediction input data objects. In some embodiments, this symmetric variability of the input space and the output space of the variable-output-space prediction machine learning model is key for ensuring effectiveness and training efficiency of the variable-output-space prediction machine learning model.

The term "variable-output-space prediction machine learning model" may refer to a data construct that describes parameters, hyper-parameters, and/or defined operations of a machine learning model that is configured to generate the variable-output-space prediction for the prediction input data object based at least in part on each candidate predictive association feature set for the dynamically-preselected predictive association subset for the prediction input data object, the input profile for the prediction input data object, and the contextual input embedding for the prediction input data object. In some embodiments, given a prediction input data object that is associated with C dynamically-preselected candidate predictive associations as selected/generated by an output space refinement machine learning model, a variable-output-space prediction machine learning model processes C predictive association feature sets for the C dynamically-preselected candidate predictive associations, the input profile for the prediction input data object as generated/selected by an input profile determination machine learning model, and the contextual input embedding for the prediction input data object as generated by a contextual input embedding machine learning model to generate the variable-output-space prediction for the prediction input data object. In some embodiments, the variable-output-space prediction machine learning model is a classification machine learning model that is configured to generate C classification scores, where each ith classification score describes a computed/predicted relationship/suitability likelihood for a prediction input data object with respect to a top ith dynamically-preselected candidate predictive association for the prediction input data object. In some embodiments, the variable-output-space prediction machine learning model is a very deep machine learning model as it needs to learn variations across different input spaces. In some embodiments, the variable-output-space prediction machine learning model is trained using ground-truth data describing, for each combination of a historical prediction input data object (e.g., each past patient) and a dynamically-preselected candidate predictive association for the historical prediction input data object (e.g., a top C medical provider for the past patient in terms of historical visitation/satisfaction), a normalized historical correlation rate (e.g., a normalized historical visitation/satisfaction rate) for the historical prediction input data object with respect to the dynamically-preselected candidate predictive association.

The term "variable-output-space prediction" may refer to a data construct that describes a selected subset of the dynamically-preselected candidate provider associations for a respective prediction input data object (aka. as the "selected provider association subset" for the respective prediction input data object). In some embodiments, given C classification scores generated by a variable-output-space prediction machine learning model for C dynamically-preselected candidate predictive associations of a prediction input data object, a D-sized subset of the C dynamically-preselected candidate predictive associations that have the highest D classification scores with respect to the prediction input data object are assigned to the selected provider association subset for the prediction input data object, where D may be less than or equal to C, and where D may be a hyper-parameter of the variable-output-space prediction machine learning model. In some embodiments, given C classification scores generated by a variable-output-space prediction machine learning model for C dynamically-preselected candidate predictive associations of a prediction input data object, each dynamically-preselected candidate predictive association whose classification score satisfies (e.g., exceeds) a classification score threshold T may be assigned to the selected predictive association subset for the prediction input data object, where T may be a hyper-parameter of the variable-output-space prediction machine learning model. In some embodiments, the variable-output-space prediction includes a ranking of the dynamically-preselected predictive association subset and/or the selected predictive association subset for the prediction input data object, where the ranking may be determined based at least in part on the classification scores generated by the variable-output-space prediction machine learning model for the dynamically-preselected candidate predictive associations in the dynamically-preselected predictive association subset and/or the selected candidate predictive associations in the selected predictive association subset.

III. COMPUTER PROGRAM PRODUCTS, METHODS, AND COMPUTING ENTITIES

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a scripting language, a database query or search language, and/or a report writing language. In one or more example embodiments, a software component comprising instructions in one of the foregoing examples of programming languages may be executed directly by an operating system or other software components without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid-state drive (SSD), solid-state card (SSC), solid-state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read-only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises a combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. EXEMPLARY SYSTEM ARCHITECTURE

FIG. 1 is a schematic diagram of an example architecture 100 for performing predictive data analysis. The architecture 100 includes a predictive data analysis system 101 configured to receive predictive data analysis requests from client computing entities 102, process the predictive data analysis requests to generate predictions, provide the generated predictions to the client computing entities 102, and automatically perform prediction-based actions based at least in part on the generated predictions. An example of a prediction-based action that can be performed using the predictive data analysis system 101 is processing a request for generating a ranked list of medical service providers for a patient.

In some embodiments, the predictive data analysis system 101 may communicate with at least one of the client computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The predictive data analysis system 101 may include a predictive data analysis computing entity 106 and a storage subsystem 108. The predictive data analysis computing entity 106 may be configured to receive predictive data analysis requests from one or more client computing entities 102, process the predictive data analysis requests to generate predictions corresponding to the predictive data analysis requests, provide the generated predictions to the client computing entities 102, and automatically perform prediction-based actions based at least in part on the generated predictions.

The storage subsystem 108 may be configured to store input data used by the predictive data analysis computing entity 106 to perform predictive data analysis as well as model definition data used by the predictive data analysis computing entity 106 to perform various predictive data analysis tasks. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Predictive Data Analysis Computing Entity

FIG. 2 provides a schematic of a predictive data analysis computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 may include, or be in communication with, one or more processing elements 205 (also referred to as processors, processing circuitry, and/or similar terms used herein interchangeably) that communicate with other elements within the predictive data analysis computing entity 106 via a bus, for example. As will be understood, the processing element 205 may be embodied in several different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application-specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the predictive data analysis computing entity 106 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the predictive data analysis computing entity 106 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include, or be in communication with, one or more input elements, such as a keyboard input, a mouse input, a touch screen/display input, motion input, movement input, audio input, pointing device input, joystick input, keypad input, and/or the like. The predictive data analysis computing entity 106 may also include, or be in communication with, one or more output elements (not shown), such as audio output, video output, screen/display output, motion output, movement output, and/or the like.

Exemplary Client Computing Entity

FIG. 3 provides an illustrative schematic representative of a client computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing entities 102 can be operated by various parties. As shown in FIG. 3, the client computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the predictive data analysis computing entity 106. In a particular embodiment, the client computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the predictive data analysis computing entity 106 via a network interface 320.

Via these communication standards and protocols, the client computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 can also download changes, add-ons, and updates, for instance, to its firmware, software (e.g., including executable instructions, applications, program modules), and operating system.

According to one embodiment, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the client computing entity's 102 position in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the predictive data analysis computing entity 106, as described herein. The user input interface can comprise any of a number of devices or interfaces allowing the client computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the entity or accessible through a browser or other user interface for communicating with the predictive data analysis computing entity 106 and/or various other computing entities.

In another embodiment, the client computing entity 102 may include one or more components or functionality that are the same or similar to those of the predictive data analysis computing entity 106, as described in greater detail above. As will be recognized, these architectures and descriptions are provided for exemplary purposes only and are not limiting to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. EXEMPLARY SYSTEM OPERATIONS

As described below, various embodiments of the present invention improve the computational efficiency of (i.e., the number of processing operations required for) performing classification of a prediction input data object by generating B classification scores with respect to B candidate predictive associations (e.g., B defined classes), where B is a large value. To accomplish this technical advantage, the noted embodiments of the present invention use an output space refinement machine learning model to filter C of the B candidate predictive associations that are referred to herein as dynamically-preselected candidate predictive associations for each prediction input data object, with every prediction input data object being associated with a different subset of the dynamically-preselected candidate predictive associations, where C is less than B and is in some embodiments typically much less than B. As described in greater detail below, this approach reduces the number of computational operations that need to be performed by a final classification machine learning model (referred to herein as a variable-output-space prediction machine learning model), and leads to substantial computational efficiency advantages relative to naïve implementations. In this way, various embodiments of the present invention improve the computational efficiency of (i.e., the number of processing operations required for) performing classification of a prediction input data object by generating B classification scores with respect to B candidate predictive associations (e.g., B defined classes), and reduce the amount of computer processing resources needed for performing classification of a prediction input data object by generating B classification scores with respect to B candidate predictive associations.

FIG. 4 is a flowchart diagram of an example process 400 for generating a variable-output-space prediction for a prediction input data object. Via the various steps/operations of the process 400, a predictive data analysis computing entity 106 can generate a contextual input embedding for the prediction input data object that describes contextual variations of feature data associated with the prediction input data object, which would enable the predictive data analysis computing entity 106 to: (i) transfer predictive insights across predictive input data entities having different input profiles when those predictive input data entities are with a common set of dynamically-preselected candidate predictive associations, and (ii) transfer predictive insights across predictive input data entities that are associated with different set of dynamically-preselected candidate predictive associations when those predictive input data entities occur within intersecting contextual input embedding subspaces of an embedding space data object.

The process 400 begins at step/operation 401 when the predictive data analysis computing entity 106 determines a dynamically-preselected provider association subset for the prediction input data object, where the dynamically-preselected provider association subset may describe a plurality of dynamically-preselected candidate provider associations that are selected from a group of candidate provider associations. In some embodiments, the dynamically-preselected provider association subset for a prediction input data object is generated by an output space refinement machine learning model (e.g., via processing an input profile of the prediction input data object).

In some embodiments, a prediction input data object describes feature data associated with a predictive entity (e.g., any real-world entity and/or virtual entity) with respect to which one or more predictive data analysis operations are performed in order to generate a respective prediction. An example of a predictive entity is an individual, such as a health insurance plan member and/or a patient. In some embodiments, a prediction input data object describes at least one of the following for a predictive entity that is associated with the prediction input data object: initial input features and embedding feature sets. In some embodiments, an initial input feature of a predictive entity is any feature of the predictive entity that can be used to generate/select an input profile for the predictive entity. Examples of such initial input features include demographic data, healthcare history data, behavioral attribute data, and/or the like. In some embodiments, an embedding feature of a predictive entity is any feature of the predictive entity that can be used to generate an isolated input embedding for the predictive entity. Examples of such embedding features include one or more automatically-selected disease conditions (e.g., one or more automatically-selected rare disease conditions, one or more automatically-selected rare disease conditions that are selected using one or more rare disease selection machine learning models, and/or the like), one or more manually-selected disease conditions (e.g., one or more manually-selected disease conditions, one or more regional sensitivity features (e.g., one or more features describing at least one spiritual awareness, social awareness, area walkability, air pollution, water pollution, eating habits, and/or the like), one or more hereditary attributes, one or more relevant genetic research attributes, one or more regional health inequity attributes (e.g., one or more features describing at least one of regional life expectancy, regional access to care, preventable death statistics, and/or the like), and/or the like.

In some embodiments, a candidate predictive association may describe a real-world entity and/or a virtual entity that can be mapped to a predictive entity. For example, when a predictive entity describes an individual, the candidate predictive associations may be providers (e.g., medical providers) that may be mapped to (e.g., recommended for) the individual and/or recommended for the individual. In some embodiments, a candidate predictive association is associated with a set of features that are described by a candidate predictive association feature set for the candidate predictive association. Examples of candidate prediction association features include at least one of demographic features, experience features, expertise features, patient engagement quality features, and/or the like. In some embodiments, the candidate prediction association features for a particular candidate predictive association include historical engagement measures for the particular candidate predictive association with respect to a set of input profiles. For example, a historical engagement measure may describe a number of past patients/individuals associated with a patient/individual profile that a particular medical provider has serviced in the past, where the patient/individual profile corresponds to the input profile associated with the historical engagement measure and the particular medical provider corresponds to the candidate predictive association associated with the historical engagement measure. As another example, a historical engagement measure may describe what ratio of past patients of a particular medical provider were in the past patients/individuals associated with a patient/individual profile, where the patient/individual profile corresponds to the input profile associated with the historical engagement measure and the particular medical provider corresponds to the candidate predictive association associated with the historical engagement measure.

In some embodiments, step/operation 401 may be performed in accordance with the process that is depicted in FIG. 5, which is an example process for generating a dynamically-preselected provider association subset for a prediction input data object 501. As depicted in FIG. 5, the prediction input data object 501 (e.g., one or more initial input features described by the prediction input data object 501) may be processed by an input profile determination machine learning model 511 to generate an input profile 521 for the prediction input data object 501.

In some embodiments, the input profile determination machine learning model is configured to process one or more initial input features of a prediction input data object to select an input profile for the prediction input data object from a set of defined A input profiles. In some embodiments, the input profile determination machine learning model is a supervised machine learning model that is configured to process the initial input features of the prediction input data object to generate a set of A classification scores, where each classification score describes a computed/predicted likelihood that the prediction input data object is associated with a corresponding input profile of the defined input profiles, and where the input profile for the prediction input data object may be the defined input profile having the highest classification score. In some embodiments, the input profile determination machine learning model is configured to generate A distance measures with respect to A input clusters, where each distance measure describes a measure of distance of an initial input feature set describing the initial input features of the prediction input data object with respect to a centroid of a respective input cluster that is associated with a respective defined input profile, where the input profile for the prediction input data object may be the defined input profile whose respective input cluster has the lowest distance measure.

In some embodiments, an input clustering machine learning model is configured to: (i) identify a set of historical prediction input data objects (e.g., a set of past patients), (ii) for each historical prediction input data object, generate an M-dimensional feature vector that describes the initial input features of the historical prediction input data object, (iii) map each M-dimensional feature vector an M-dimensional space data object that describes an M-dimensional input mapping for each historical prediction input data object, (iv) process the M-dimensional space data object using a clustering routine (e.g., a k-means clustering routine) to generate a set of A input clusters that comprises a subset of the M-dimensional input mappings for a corresponding subset of the historical prediction input data objects, and (v) assign each input cluster to a respective defined input profile. Accordingly, in some embodiments, the input clustering machine learning model generates a set of A defined input profiles each corresponding to an input cluster of the A input clusters generated by the input clustering machine learning model.

In some embodiments, once the input clustering machine learning model generates A input clusters associated with A defined input profiles, the input profile determination machine learning model can use the A input clusters to determine A distance measures for a prediction input data object by using the following operations: (i) generate an M-dimensional input mapping for the prediction input data object in the M-dimensional space data object based at least in part on the initial input features for the prediction input data object, and (ii) for each defined input profile that is associated with a respective input cluster, determine a distance measure (e.g., a Euclidean distance measure) in the M-dimensional space data object between the M-dimensional input mapping of the prediction input data object and an M-dimensional point of the M-dimensional space data object that describes positioning of the respective input cluster within the M-dimensional mapping data object (e.g., an M-dimensional point corresponding to a centroid measure for the respective cluster).

In some embodiments, a defined input profile describes a categorization that can be assigned to a prediction input data object based at least in part on feature data associated with the prediction input data object. An example of a defined input profile is a patient persona that can be assigned to a prediction input data object for a patient/individual predictive entity based at least in part on patient/individual attributes associated with the noted prediction input data object. In some embodiments, a set of A defined input profiles are generated by clustering a set of historical prediction input data objects into a set of A input clusters and then assigning each input cluster to a defined input profile. In some embodiments, once A defined input profiles are generated, a particular input profile of the A defined input profiles may be assigned to a prediction input data object if at least one of the following conditions is satisfied: (i) the classification score for the defined input profile with respect to the prediction input data object is the highest classification score of A classification scores associated with the prediction input data object, and (ii) the distance measure for the defined input profile with respect to the prediction input data object is the lowest distance measure for the defined input profile with respect to the prediction input data object.

In some embodiments, inputs to an input profile determination machine learning model include a feature vector describing a set of initial input features of a prediction input data object. In some embodiments, outputs of an input profile determination machine learning model comprise at least one of the following: (i) a vector and/or an atomic value describing a selected input profile for the prediction input data object, (ii) a vector describing A classification scores for the prediction input data object with respect to A defined input profiles, (iii) a vector describing A distance measures for the prediction input data object with respect to A defined input profiles (e.g., with respect to A input clusters of the A defined input profiles). In some embodiments, when the input profile determination is a supervised machine learning framework, the input profile determination machine learning model is trained based at least in part on ground-truth data describing historical input profiles for a set of historical prediction input data objects (e.g., historical patient profiles for a set of past patients as determined by a subject matter expert routine and/or as designated by the past patients).

In some embodiments, inputs to an input clustering machine learning model comprise a set of feature vectors comprising a feature vector for each historical prediction input data object that describes initial input features associated with the historical prediction input data object. In some embodiments, outputs of an input clustering machine learning model include a vector describing centroid points for A input clusters generated by the input clustering machine learning model. In some embodiments, outputs of an input clustering machine learning model comprise A vectors each associated with an input cluster generated by the input clustering machine learning model and describing cluster features of the noted cluster. In some embodiments, A is defined by a hyper-parameter of the input clustering machine learning model.

As further depicted in FIG. 5, an output space refinement machine learning model 531 is configured to process: (i) the input profile 521 of the prediction input data object 501 (e.g., feature data associated with the input profile, such as feature data described by a fixed-dimensional embedded representation of the input profile), and (ii) B candidate provider association feature sets 522 for B candidate provider associations to generate/select a dynamically-preselected predictive association subset 541 for the prediction input data object 501. In other words, the output space refinement machine learning model 531 is configured to select a subset of the B candidate provider associations for the prediction input data object 501. In some embodiments, each candidate provider association feature set that is associated with a respective candidate provider association describes at least the historical engagement measure (e.g., a patient mix ratio measure) of the respective candidate provider association with respect to prediction data objects that are deemed related to the prediction input data object 501 (e.g., that have the same input profile 521 as the prediction input data object 501).

In some embodiments, an output space refinement machine learning model is configured to select a dynamically-preselected predictive association subset for a prediction input data object. In some embodiments, the output space refinement machine learning model is a classification machine learning model that is configured to generate, for each of B candidate predictive associations, a classification score, where C of the B candidate provider associations having highest classification scores are selected as the dynamically-preselected predictive association subset for the prediction input data object. In some embodiments, C is a hyper-parameter of the output space refinement machine learning model. In some embodiments, the output space refinement machine learning model is configured to generate/select the dynamically-preselected predictive association subset for a prediction input data object based at least in part on the input profile for the prediction input data object and/or feature data associated with the B candidate predictive associations.

For example, in some embodiments, the output space refinement machine learning model is configured to process a patient persona for a patient/individual along with feature data associated with B medical providers in order to select a subset of the B medical providers that are deemed to be most suitable for the patient/individual, where the subset includes C medical providers. In this way, because C<B, the output space refinement machine learning model may in some embodiments be useful for a first-level filtering of the medical providers applicable to a patient/individual, where the output of the noted first-level filtering may be used to generate/define the output space of a variable-output-space prediction machine learning model. In other words, in some embodiments, to generate a variable-output-space prediction for a particular patient/individual, instead of generating B prediction scores with respect to B medical providers (where B may be a very large number), the variable-output-space prediction machine learning model may generate C prediction scores with respect to a C-sized subset of the B medical providers containing the most relevant medical providers. Because C<B, this means that the computational complexity of generating B prediction scores using a variable-output-space prediction machine learning model is higher than the computational complexity of generating C prediction scores using the variable-output-space prediction machine learning model, and that this computational complexity gap widens as the gap between B and C increases (e.g., for a fixed C, as B increases).

In some embodiments, the output space refinement machine learning model is a supervised machine learning model that is configured to generate B prediction scores for a prediction input data object with respect to B candidate predictive associations. As described above, the output space refinement machine learning model is configured to define the output space of a variable-output-space prediction machine learning model, where the output space of a machine learning model may describe the range of classes that the machine learning model may assign to a single prediction input. In this way, in some embodiments, the output space refinement machine learning model has a fixed output space (e.g., a fixed output space comprising the B predictive associations) for all prediction input data objects, while the variable-output-space prediction machine learning model has a variable output space for each prediction input data object, where the variable output space of a particular prediction input data object may be determined based at least in part on the classification scores generated by the output space refinement machine learning model via processing the input profile associated with the particular prediction input data object (e.g., via processing a fixed-dimensional representation of the input profile such as a fixed-dimensional embedding of the input profile).

Accordingly, as described above, in some embodiments, an output space refinement machine learning model performs B predictive inferences, while the variable-output-space prediction machine learning model performs C predictive inferences. In some of the noted embodiments, the output space refinement machine learning model either performs much less computationally intensive feature processing operations for each predictive inference, or is much less deeper, or both, such that if the output space refinement machine learning model performs $\alpha$ operations per predictive inference, and the variable-output-space prediction machine learning model performs $\beta$ operations per predictive inference, then $\alpha \ll \beta$. This means that, given a sufficiently large gap between $\alpha$ and $\beta$ the computational complexity of performing operations of the output space refinement machine learning model followed by operations of the variable-output-space prediction machine learning model (i.e., $O(\alpha\beta+\beta C)$) is less than the computational complexity of performing operations of a naïve solution where a single deep machine learning framework performs B predictive inferences (i.e., $O(\beta B)$). In this way, using the combination of an output space refinement machine learning model followed by a variable-output-space prediction machine learning framework improves the computational complexity of performing deep learning with respect to predictive tasks that have a large prediction space (in this case, a large B value).

In some embodiments, inputs to an output space refinement machine learning model comprises B+1 vectors, including B vectors describing B candidate predictive association feature sets for B candidate predictive associations, and one vector describing feature data associated with an input profile of a prediction input data object. In some embodiments, outputs of an output space refinement machine learning model comprise at least one of the following: (i) a vector describing B classification scores for B candidate predictive associations with respect to the prediction input data object, (ii) a vector describing identifiers of C candidate predictive associations that have the highest classification scores for the candidate predictive association with respect to the prediction input data object (e.g., that are in the dynamically-preselected predictive association subset for the prediction input data object), and (iii) C vectors each describing feature data (e.g., a fixed-dimensional representation, a candidate provider association feature set, and/or the like) for a respective candidate predictive association of C candidate predictive associations that have the highest classification scores for the candidate predictive association with respect to the prediction input data object (e.g., that are in the dynamically-preselected predictive association subset for the prediction input data object). In some embodiments, the output space refinement machine learning model is trained using ground-truth data that describe, for each historical prediction input data object (e.g., for each past/observed patient/member/individual), C candidate predictive associations that have the highest historical correlation scores (e.g., C medical providers that have the highest visitation/satisfaction ratios/scores based at least in part on historical visitation/satisfaction data) with respect to the historical prediction input data object.

Returning to FIG. 4, at step/operation 402, the predictive data analysis computing entity 106 generates an isolated N-dimensional input embedding for the prediction input data object. In some embodiments, the predictive data analysis computing entity 106 processes embedding features of the prediction input data object using an isolated input embedding machine learning model to generate the isolated N-dimensional input embedding for the prediction input data object.

In some embodiments, step/operation 402 may be performed in accordance with the process that is depicted in FIG. 6, which is an example process for generating an isolated N-dimensional input embedding 611 for a prediction input data object 501. According to the process that is depicted in FIG. 6, an isolated embedding machine learning model 601 processes feature data associated with a prediction input data object 501 (e.g., processes one or more embedding features associated with the prediction input data object 501) to generate an isolated N-dimensional input embedding 611 for the prediction input data object 501.

In some embodiments, an isolated embedding machine learning model is configured to process one or more embedding features of a prediction input data object to generate an isolated N-dimensional input embedding for the prediction input data object. In some embodiments, the isolated embedding machine learning model is configured to generate a fixed-dimensional representation of the prediction input data object that is determined based at least in part on feature data about the prediction input data object without incorporating predictive insights about feature data of potential prediction input data objects that are deemed related to (e.g., similar to) the target prediction input data object. In some embodiments, the isolated embedding machine learning model comprises N machine learning sub-models (e.g., N regression machine learning models), where the N machine learning sub-models may have a common/shared input (e.g., may all process the same embedding features of the prediction input data object) to generate one of the N dimensional regression outputs described by the isolated N-dimensional input embedding for the prediction input data object. In some embodiments, each machine learning sub-model of the isolated input embedding machine learning model (e.g., each regression machine learning sub-model of the isolated input embedding machine learning model) is configured to generate a dimensional regression output for the prediction input data object based at least in part on a shared embedding feature set that is determined based at least in part on the one or more embedding features for the prediction input data object, where the shared embedding feature set may describe at least a subset of the embedding features associated with the prediction input data object.

In some embodiments, an isolated N-dimensional input embedding is a fixed-size representation of a corresponding prediction input data object. In some embodiments, each of the N values described by an isolated N-dimensional input embedding is generated by a machine learning sub-model (e.g., a regression machine learning sub-model) of the isolated N-dimensional embedding based at least in part on the embedding features associated with the prediction input data object. For example, given N=8, the isolated embedding machine learning may comprise: a machine learning sub-model that is configured to process the embedding features of a prediction input data object to generate a water borne disease sensitivity score for the prediction input data object, a machine learning sub-model that is configured to process the embedding features of a prediction input data object to generate an air borne disease sensitivity score for the prediction input data object, a machine learning sub-model that is configured to process the embedding features of a prediction input data object to generate a health-inequity-based sensitivity score for the prediction input data object, a machine learning sub-model that is configured to process the embedding features of a prediction input data object to generate an environment-based disease sensitivity score for the prediction input data object, a machine learning sub-model that is configured to process the embedding features of a prediction input data object to generate a digital-usage-based disease sensitivity score for the prediction input data object, a machine learning sub-model that is configured to process the embedding features of a prediction input data object to generate a gene-based disease sensitivity score for the prediction input data object, a machine learning sub-model that is configured to process the embedding features of a prediction input data object to generate an in-home supportive care sensitivity score for the prediction input data object, and a machine learning sub-model that is configured to process the embedding features of a prediction input data object to generate a lifestyle-based disease sensitivity score for the prediction input data object.

In some embodiments, inputs to the isolated input embedding machine learning model comprise a vector describing the embedded features of the prediction input data object. In some embodiments, outputs of the isolated input embedding machine learning model comprise an N-sized vector describing the isolated N-dimensional input embedding for the prediction input data object. In some embodiments, the isolated input embedding machine learning model is trained using ground-truth scores, such as ground-truth scores determined based at least in part on historical data associated with historical prediction input data objects (e.g., ground-truth sensitivity designations/scores for past patients/members determined based at least in part on patient/member health history data) and/or ground-truth scores determined based at least in part on subject-matter-expert designations/scores (e.g., ground-truth sensitivity designation/scores determined based at least in part on medical expert feedback regarding a particular patient/member).

Returning to FIG. 4, at step/operation 403, the predictive data analysis computing entity 106 generates a contextual input embedding for the prediction input data object. In some embodiments, the predictive data analysis computing entity 106 uses a contextual input embedding machine learning model to generate an N-dimensional contextual embedding space data object to which an isolated N-dimensional input embedding of the prediction input data object is mapped, and uses the N-dimensional contextual embedding space data object to generate a contextual input embedding for the prediction input data object.

In some embodiments, a contextual input embedding machine learning model is configured to generate a contextual input embedding for a prediction input data object based at least in part on an isolated N-dimensional input embedding for the prediction input data object. In some embodiments, to generate the contextual input embedding for a prediction input data object, the contextual embedding machine learning model performs the following operations: (i) mapping the isolated N-dimensional input embedding for the prediction input data object to an N-dimensional contextual embedding space data object, (ii) detecting an N-dimensional contextual embedding subspace of the N-dimensional contextual embedding space data object for the prediction input data object that includes an area within the N-dimensional contextual embedding space data object that is associated with a geometric shape with a subspace geometric shape profile (e.g., a hypercube profile) with defined geometric measurements (e.g., with a defined side measurement value) that is centered at the mapping of the isolated N-dimensional input embedding, and (iii) generating the contextual input embedding based at least in part on one or more detected geometric properties of the N-dimensional contextual embedding subspace. In some embodiments, inputs to the contextual input embedding machine learning model comprise a vector describing the isolated N-dimensional input embedding for a prediction input data object, while outputs of the contextual input embedding machine learning model comprise a vector describing the contextual input embedding for the prediction input data object.

In some embodiments, at least one of the subspace geometric shape profile of the N-dimensional contextual embedding subspace for a prediction input data object or the geometric measurements of the N-dimensional contextual embedding subspace for a prediction input data object may be determined based at least in part on an input profile of the prediction input data object. In some embodiments, model configuration data for a contextual input embedding machine learning model associates each defined input profile to a respective subspace geometric shape profile. In some embodiments, model configuration data for the contextual input embedding machine learning model associates each defined input profile to one or more defined geometric measurements for the respective subspace geometric shape profile that is associated with the defined input profile. In some embodiments, the defined geometric shape of the N-dimensional contextual embedding subspace for a prediction input data object is determined by mapping the input profile of the prediction input data object to a particular geometric shape having a particular subspace geometric shape profile (i.e., a particular geometric shape type, such as a hypercube geometric shape type, a hyperrectangle geometric shape type, an n-circle geometric shape type, and/or the like) and optionally one or more geometric measurements for the particular subspace geometric shape profile.

For example, given four defined input profiles (e.g., four defined patient personas) $P_1$, $P_2$, $P_3$, and $P_4$, model configuration data for a contextual input embedding machine learning model may define the following: (i) $P_1$ is associated with a hypercube subspace geometric shape profile, (ii) $P_2$ is associated with a hyperrectangle subspace geometric shape profile, (iii) $P_3$ is associated with a hypercube subspace geometric shape profile, and (iv) $P_4$ is associated with a hypercube subspace geometric shape profile. As another example, given four defined input profiles (e.g., four defined patient personas) $P_1$, $P_2$, $P_3$, and $P_4$, model configuration data for a contextual input embedding machine learning model may define the following: (i) $P_1$ is associated with a hypercube subspace geometric shape profile with a side magnitude value of 0.2, (ii) $P_2$ is associated with a hyperrectangle subspace geometric shape profile with a length magnitude value of 0.1 and a width magnitude value 0.3, (iii) $P_3$ is associated with a hypercube subspace geometric shape profile with a radius of 0.15, and (iv) $P_4$ is associated with a hypercube subspace geometric shape profile with a radius of 0.25.

In some embodiments, once generated/detected, an N-dimensional contextual embedding subspace of a particular prediction input data object can be used to generate a contextual input embedding that describes not only feature data about the particular prediction input data object in isolation but also feature data about feature data of potential surrounding/related prediction input data objects of the particular prediction input data object. In some of the noted embodiments, the contextual input embedding is then provided as an input to a variable-output-space prediction machine learning model. Accordingly, in some embodiments, determining geometric properties of the N-dimensional contextual embedding subspace for a prediction input data object based at least in part on the input profile of the prediction input data object enables the variable-output-space prediction machine learning model to have an input that is variable for different prediction input data objects, as different prediction input data objects may have different input profiles and thus different geometric shapes for N-dimensional contextual embedding subspaces and consequently different contextual input embeddings. Thus, in some embodiments, just as the output space of the variable-output-space prediction machine learning model is different for different prediction input data objects, the input space of the variable-output-space prediction machine learning model is also different for different prediction input data objects. In some embodiments, this symmetric variability of the input space and the output space of the variable-output-space prediction machine learning model is key for ensuring effectiveness and training efficiency of the variable-output-space prediction machine learning model.

In some embodiments, step/operation 403 may be performed in accordance with the process that is depicted in FIG. 7, which is an example process for generating a contextual input embedding for a prediction input data object using operations of a contextual embedding machine learning model. The process that is depicted in FIG. 7 begins at step/operation 701 when the predictive data analysis computing entity 106 generates the N-dimensional contextual embedding space data object. In some embodiments, the N-dimensional contextual embedding space data object describes, for each of the N dimensions associated with isolated N-dimensional input embeddings of prediction input data objects, the allowable range of the dimension.

For example, given N=8, the N-dimensional contextual embedding space data object may describe an eight-dimensional contextual embedding space associated with a dimension that is associated with a water borne disease sensitivity score, a dimension that is associated with an air borne disease sensitivity score, a dimension that is associated with a health-inequity-based sensitivity score, a dimension that is associated with an environment-based disease sensitivity score, a dimension that is associated with a digital-usage-based disease sensitivity score, a dimension that is associated with a gene-based disease sensitivity score, a dimension that is associated with an in-home supportive care sensitivity score, and a dimension that is associated with a lifestyle-based disease sensitivity score. The N-dimensional contextual embedding space data object may also describe that each of the noted eight dimensions has an allowable range of [0,1] (i.e., may take a value between 0 and 1).

At step/operation 702, the predictive data analysis computing entity 106 maps the isolated N-dimensional input embedding of the prediction input data object to the N-dimensional contextual embedding space data object to generate an N-dimensional input mapping for the prediction input data object. Then, at step/operation 703, the predictive data analysis computing entity 106 identifies the defined geometric shape for the input profile of the prediction input data object and, at step/operation 704, the predictive data analysis computing entity 106 generates the N-dimensional contextual embedding subspace for the prediction input data object as an area within the overall area defined by the N-dimensional contextual embedding space data object that has the defined geometric shape and that is centered at the N-dimensional input mapping for the prediction input data object.

In some embodiments, while the N-dimensional contextual embedding space data object describes overall ranges for each of the N dimensions of isolated N-dimensional input embeddings, the N-dimensional contextual embedding subspace describes a subrange for each dimension that corresponds to the area described by the N-dimensional contextual embedding subspace. For example, for N=3, where all three dimensions are associated with the range [0, 1], if the N-dimensional input mapping for a prediction input data object is (0.5, 0.5, 0.5), and if the defined geometric shape for the N-dimensional contextual embedding space for the prediction input data object is a hypercube with a side magnitude value of 0.2, then the N-dimensional contextual embedding subspace for the prediction input data object (which is a 3-dimensional cube) is associated with the following subranges: for the first dimension, the subrange [0.4, 0.06]; for the second dimension, the subrange [0.4, 0.6]; and for the third dimension, the subrange [0.4, 0.6].

An operational example of an N-dimensional contextual embedding subspace 801 for a prediction input data object is depicted in FIG. 8. As depicted in FIG. 8, the N-dimensional contextual embedding subspace 801 is an area within the overall area of the N-dimensional contextual embedding space data object 800 (where N=3). As further depicted in FIG. 8, the N-dimensional contextual embedding subspace 801 has a hyperrectangle geometric shape profile.

At step/operation 705, the predictive data analysis computing entity 106 generates the contextual input embedding based at least in part on one or more geometric properties of the N-dimensional contextual embedding subspace. For example, the contextual input embedding may describe, for each of the N dimensions, the subrange of the overall range for the dimension that corresponds to the N-dimensional contextual embedding subspace. As another example, the contextual input embedding may escribe, for each of the N dimensions, a midrange of the subrange of the overall range for the dimension that corresponds to the N-dimensional contextual embedding subspace.

Returning to FIG. 4, at step/operation 404, the predictive data analysis computing entity 106 generates the variable-output-space prediction for the prediction input data object based at least in part on each candidate predictive association feature set for the dynamically-preselected predictive association subset for the prediction input data object, the input profile for the prediction input data object, and the contextual input embedding for the prediction input data object. In some embodiments, given a prediction input data object that is associated with C dynamically-preselected candidate predictive associations as selected/generated by an output space refinement machine learning model, a variable-output-space prediction machine learning model processes C predictive association feature sets for the C dynamically-preselected candidate predictive associations, the input profile for the prediction input data object as generated/selected by an input profile determination machine learning model, and the contextual input embedding for the prediction input data object as generated by a contextual input embedding machine learning model to generate the variable-output-space prediction for the prediction input data object.

In some embodiments, step/operation 404 may be performed in accordance with the process that is depicted in FIG. 9, which is an example process for generating a variable-output-space prediction 921 for a prediction input data object by using a variable-output-space prediction machine learning model 911. As depicted in FIG. 9, the variable-output-space prediction machine learning model 911 processes the candidate predictive association feature sets 901 associated with the dynamically-preselected candidate predictive associations in the dynamically-preselected candidate predictive association subset for the prediction input data object, feature data associated with (e.g., a fixed-dimensional representation of) the input profile 521 for the prediction input data object, and the contextual input embedding 902 for the prediction input data object to generate the variable-output-space prediction 921 for the prediction input data object.

In some embodiments, the variable-output-space prediction machine learning model is a classification machine learning model that is configured to generate C classification scores, where each ith classification score describes a computed/predicted relationship/suitability likelihood for a prediction input data object with respect to a top ith dynamically-preselected candidate predictive association for the prediction input data object. For example, in some embodiments, the C dynamically-preselected candidate predictive associations may be ranked in a particular order (e.g., in a descending order, in an ascending order, and/or the like) based at least in part on classification scores generated by the output refinement machine learning model for C dynamically-preselected candidate predictive associations with respect to a prediction input data object. Then, each ith classification score generated by the variable-output-space prediction machine learning model may describe the relationship/suitability score for the ith dynamically-preselected candidate predictive association in the ordered list.

In some embodiments, the variable-output-space prediction machine learning model is a very deep machine learning model as it needs to learn variations across different input spaces. In some embodiments, the variable-output-space prediction machine learning model is trained using ground-truth data describing, for each combination of a historical prediction input data object (e.g., each past patient) and a dynamically-preselected candidate predictive association for the historical prediction input data object (e.g., a top C medical provider for the past patient in terms of historical visitation/satisfaction), a normalized historical correlation rate (e.g., a normalized historical visitation/satisfaction rate) for the historical prediction input data object with respect to the dynamically-preselected candidate predictive association. In some embodiments, inputs to the variable-output-space prediction machine learning model comprise one or more vectors (e.g., C+2 vectors) describing the input profile for a prediction input data object, the C candidate predictive association feature sets for the C dynamically-preselected candidate predictive associations of the prediction input data object, and the contextual input embedding for the prediction input data object. In some embodiments, outputs of the variable output space machine learning model comprise a vector and/or an atomic value describing a variable-output-space prediction.

In some embodiments, the variable-output-space prediction describes a selected subset of the dynamically-preselected candidate provider associations for a respective prediction input data object (aka. as the "selected provider association subset" for the respective prediction input data object). In some embodiments, given C classification scores generated by a variable-output-space prediction machine learning model for C dynamically-preselected candidate predictive associations of a prediction input data object, a D-sized subset of the C dynamically-preselected candidate predictive associations that have the highest D classification scores with respect to the prediction input data object are assigned to the selected provider association subset for the prediction input data object, where D may be less than or equal to C, and where D may be a hyper-parameter of the variable-output-space prediction machine learning model. In some embodiments, given C classification scores generated by a variable-output-space prediction machine learning model for C dynamically-preselected candidate predictive associations of a prediction input data object, each dynamically-preselected candidate predictive association whose classification score satisfies (e.g., exceeds) a classification score threshold T may be assigned to the selected predictive association subset for the prediction input data object, where T may be a hyper-parameter of the variable-output-space prediction machine learning model. In some embodiments, the variable-output-space prediction includes a ranking of the dynamically-preselected predictive association subset and/or the selected predictive association subset for the prediction input data object, where the ranking may be determined based at least in part on the classification scores generated by the variable-output-space prediction machine learning model for the dynamically-preselected candidate predictive associations in the dynamically-preselected predictive association subset and/or the selected candidate predictive associations in the selected predictive association subset.

For example, in some embodiments, the variable-output-space prediction for a prediction input data object that is associated with a patient/member predictive entity may describe the top D medical providers for the patient/member predictive entity. As another example, in some embodiments, the variable-output-space prediction for a prediction input data object that is associated with a patient/member predictive entity may describe the medical providers with threshold-satisfying classification scores for the patient/member predictive entity. As yet another example, in some embodiments, the variable-output-space prediction for a prediction input data object that is associated with a patient/member predictive entity may describe the ranking of the top D medical providers for the patient/member predictive entity. As a further example, in some embodiments, the variable-output-space prediction for a prediction input data object that is associated with a patient/member predictive entity may describe the ranking of the medical providers with threshold-satisfying classification scores for the patient/member predictive entity.

As described above, while the output space refinement machine learning model has a fixed output space (e.g., a fixed output space comprising the B predictive associations) for all prediction input data objects, the variable-output-space prediction machine learning model has a variable output space for each prediction input data object, where the variable output space of a particular prediction input data object may be determined based at least in part on the classification scores generated by the output space refinement machine learning model via processing the input profile associated with the particular prediction input data object (e.g., via processing a fixed-dimensional representation such as a fixed-dimensional embedding of the input profile). Moreover, in some embodiments, while an output space refinement machine learning model performs B predictive inferences, a variable-output-space prediction machine learning model performs C predictive inferences. This may mean that, given a sufficiently large gap between α and β the computational complexity of performing operations of the output space refinement machine learning model followed by operations of the variable-output-space prediction machine learning model (i.e., O(αβ+βC)) is less than the computational complexity of performing operations of a naïve solution where a single deep machine learning framework performs B predictive inferences (i.e., O(βB)). In this way, using the combination of an output space refinement machine learning model followed by a variable-output-space prediction machine learning framework improves the computational complexity of performing deep learning with respect to predictive tasks that have a large prediction space (in this case, a large B value).

In some embodiments, to enable a variable-output-space prediction machine learning model to learn the complex predictive of task of generating effective predictions across varying output spaces, the input space of the variable-output-space prediction machine learning model may be designed such that the noted input space may also be dynamically adjustable across prediction input data objects. For example, in some embodiments, once generated/detected, an N-dimensional contextual embedding subspace of a particular prediction input data object can be used to generate a contextual input embedding that describes not only feature data about the particular prediction input data object in isolation but also feature data about feature data of potential surrounding/related prediction input data objects of the particular prediction input data object. In some of the noted embodiments, the contextual input embedding is then provided as an input to a variable-output-space prediction machine learning model. Accordingly, in some embodiments, determining geometric properties of the N-dimensional contextual embedding subspace for a prediction input data object based at least in part on the input profile of the prediction input data object enables the variable-output-space prediction machine learning model to have an input that is variable for different prediction input data objects, as different prediction input data objects may have different input profiles and thus different geometric shapes for N-dimensional contextual embedding subspaces and consequently different contextual input embeddings. Thus, in some embodiments, just as the output space of the variable-output-space prediction machine learning model is different for different prediction input data objects, the input space of the variable-output-space prediction machine learning model is also different for different prediction input data objects. In some embodiments, this symmetric variability of the input space and the output space of the variable-output-space prediction machine learning model is key for ensuring effectiveness and training efficiency of the variable-output-space prediction machine learning model.

Returning to FIG. 4, at step/operation 405, the predictive data analysis computing entity 106 performs one or more prediction-based actions based at least in part on the variable-output-space prediction (e.g., based at least in part on a predictive score for each selected candidate predictive association that is determined based at least in part on a position of the selected candidate predictive association within a ranking of selected candidate predictive associations as described by the variable-output-space prediction). Examples of prediction-based actions include generating user interface data for a prediction user interface that describes one or more predictive scores for a particular selected candidate predictive association and/or one or more intermediate values used to generate the score, and providing the user interface data for display using a client computing entity.

Other examples of prediction-based actions include generating user interface data for a prediction user interface that describes a ranking of one or more candidate predictive associations in response to an incoming service request, where: (i) the one or more recommended candidate predictive associations provide the services associated with the service identifier of the incoming service request and/or satisfy one or more criteria associated with the recipient identifier of the incoming service request, and (ii) the ranking is determined based at least in part on the predictive scores of the recommended candidate predictive associations. An operational example of such a prediction output user interface 1000 is depicted in FIG. 10. As depicted in FIG. 10, each recommended provider identifier is within a predefined geographic location of the patient identifier associated with a corresponding incoming service request, and the ranking is performed based at least in part on predictive scores of the recommended provider identifiers, such that the recommended provider identifier 1001 has a higher predictive score relative to the provider identifier 1002.

Other examples of prediction-based actions include automatically scheduling medical appointments corresponding to a clinical intervention recommendation that is determined based at least in part on the predictive scores for a set of candidate predictive associations and/or automatically transmitting medication/treatment requests corresponding to the clinical intervention recommendation. In some embodiments, performing prediction-based actions includes generating user interface data for a prediction output user interface that is configured to display a sequence of recommended clinical interventions along with future clinical states that are predicted to result from performing the sequence of recommended clinical interventions.

In some embodiments, performing the actions comprises performing operational load balancing for the post-prediction systems (e.g., for automated appointment scheduling systems). For example, in some embodiments, a predictive data analysis computing entity determines D predictive scores for D candidate predictive associations based at least in part on a ranking for the D candidate predictive associations as described by a variable-output-space prediction. Then, the count of D candidate predictive associations that are associated with a threshold-satisfying predictive score, along with a resource utilization ratio for each candidate predictive association, can be used to predict a predicted number of computing entities needed to perform post-prediction processing operations with respect to the D candidate predictive associations. For example, in some embodiments, the number of computing entities needed to perform post-prediction processing operations (e.g., automated investigation operations) with respect to D candidate predictive associations can be determined based at least in part on the output of the equation:

$$R = \text{ceil}\left(\sum_{k}^{k=K} ur_k\right),$$

where R is the predicted number of computing entities needed to perform post-prediction processing operations with respect to the D candidate predictive associations, ceil(•) is a ceiling function that returns the closest integer that is greater than or equal to the value provided as the input parameter of the ceiling function, k is an index variable that iterates over K candidate predictive associations among the D candidate predictive associations that are associated with threshold-satisfying predictive scores, and $ur_k$ is the estimated resource utilization ratio for a kth candidate predictive association that may be determined based at least in part on a system complexity of a server system associated with the candidate predictive association. In some embodiments, once R is generated, a predictive data analysis computing entity can use R to perform operational load balancing for a server system that is configured to perform post-prediction processing operations with respect to D candidate predictive associations. This may be done by allocating computing entities to the post-prediction processing operations if the number of currently-allocated computing entities is below R, and deallocating currently-allocated computing entities if the number of currently-allocated computing entities is above R.

Accordingly, as described above, various embodiments of the present invention improve the computational efficiency of (i.e., the number of processing operations required for) performing classification of a prediction input data object by generating B classification scores with respect to B candidate predictive associations (e.g., B defined classes), where B is a large value. To accomplish this technical advantage, the noted embodiments of the present invention use an output space refinement machine learning model to filter C of the B candidate predictive associations that are referred to herein as dynamically-preselected candidate predictive associations for each prediction input data object, with every prediction input data object being associated with a different subset of the dynamically-preselected candidate predictive associations, where C is less than B and is in some embodiments typically much less than B. As described in greater detail below, this approach reduces the number of computational operations that need to be performed by a final classification machine learning model (referred to herein as a variable-output-space prediction machine learning model), and leads to substantial computational efficiency advantages relative to naïve implementations. In this way, various embodiments of the present invention improve the computational efficiency of (i.e., the number of processing operations required for) performing classification of a prediction input data object by generating B classification scores with respect to B candidate predictive associations (e.g., B defined classes), and reduce the amount of computer processing resources needed for performing classification of a prediction input data object by generating B classification scores with respect to B candidate predictive associations.

VI. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:

providing, by one or more processors, a prediction input data object to a machine learning framework to receive a variable-output-space prediction, wherein the machine learning framework comprises:

(i) a multi-class classification machine learning model configured to generate a plurality of classification scores, respectively corresponding to a plurality of candidate predictive associations, based on an input vector corresponding to the prediction input data object and a plurality of candidate vectors respectively corresponding to the plurality of candidate predictive associations, (ii) an isolated embedding model configured to generate an isolated input embedding based on the input vector, (iii) a contextual embedding model configured to generate a contextual input embedding for the prediction input data object based at least in part on the isolated input embedding, wherein the contextual input embedding is generated based at least in part on a contextual input embedding subspace associated with a hypercube subspace geometric shape profile of a plurality of hypercube subspace geometric shape profiles, and (iv) a deep learning model configured to generate the variable-output-space prediction based on (a) a vector subset of the plurality of candidate vectors respectively corresponding to an association subset of the plurality of candidate predictive associations respectively associated with a score subset of the plurality of classification scores that meets or exceeds a threshold and (b) the contextual input embedding, wherein the multi-class classification machine learning model performs less computationally intensive operations than the deep learning model due to an input space of the contextual input embedding; and providing, by the one or more processors, the variable-output-space prediction as an output of the machine learning framework.

2. The computer-implemented method of claim 1, wherein a candidate predictive association feature set for a candidate predictive association of the plurality of candidate predictive associations comprises a historical engagement measure for the candidate predictive association with respect to a defined input profile.

3. The computer-implemented method of claim 1, further comprising:

generating a plurality of defined input profiles by:

identifying a group of historical prediction input data objects;

generating, using an input clustering machine learning model and based at least in part on a group of initial historical input feature sets for the group of historical prediction input data objects, a plurality of input clusters; and generating the plurality of defined input profiles based at least in part on the plurality of input clusters.

4. The computer-implemented method of claim 3, wherein generating a defined input profile for the prediction input data object comprises:

determining a plurality of distance measures corresponding to the plurality of input clusters, wherein a distance measure of the plurality of distance measures indicates a distance from an initial historical input feature set for the prediction input data object to an initial historical input feature set of the plurality of input clusters; and generating the defined input profile based at least in part on the plurality of distance measures.

5. The computer-implemented method of claim 4, wherein the machine learning framework is trained based on a plurality of ground-truth scores, wherein a ground-truth score of the plurality of ground-truth scores is based on the group of historical prediction input data objects.

6. The computer-implemented method of claim 1, wherein:

the isolated embedding model comprises machine learning sub-models configured to generate a plurality of dimensional regression outputs for the prediction input data object, and a regression machine learning sub-model of the machine learning sub-models is configured to generate a dimensional regression output of the plurality of dimensional regression outputs based at least in part on a shared embedding feature set that is determined based at least in part on one or more embedding features for the prediction input data object.

7. The computer-implemented method of claim 6, wherein the isolated input embedding is generated based at least in part on the plurality of dimensional regression outputs.

8. A system comprising:

one or more processors; and at least one memory storing processor-executable instructions that, when executed by any one or more of the one or more processors, causes the one or more processors to perform operations comprising:

provide prediction input data object to a machine learning framework to receive a variable-output-space prediction, wherein the machine learning framework comprises:

(i) a multi-class classification machine learning model configured to generate a plurality of classification scores, respectively corresponding to a plurality of candidate predictive associations, based on an input vector corresponding to the prediction input data object and a plurality of candidate vectors respectively corresponding to the plurality of candidate predictive associations, (ii) an isolated embedding model configured to generate an isolated input embedding based on the input vector, (iii) a contextual embedding model configured to generate a contextual input embedding for the prediction input data object based at least in part on the isolated input embedding, wherein the contextual input embedding is generated based at least in part on a contextual input embedding subspace associated with a subspace geometric shape profile of a plurality of hypercube subspace geometric shape profiles, and (iv) a deep learning model configured to generate the variable-output-space prediction based on (a) a vector subset of the plurality of candidate vectors respectively corresponding to an association subset of the plurality of candidate predictive associations respectively associated with a score subset of the plurality of classification scores that meets or exceeds a threshold and (b) the contextual input embedding, wherein the multi-class classification machine learning model performs less computationally intensive operations than the deep learning model due to an input space of the contextual input embedding; and provide the variable-output-space prediction as an output of the machine learning framework.

9. The system of claim 8, wherein a candidate predictive association feature set for a candidate predictive association of the plurality of candidate predictive associations comprises a historical engagement measure for the candidate predictive association with respect to a defined input profile.

10. The system of claim 8, wherein the operations further comprise:

generating a plurality of defined input profiles by:

identifying a group of historical prediction input data objects;

generating, using an input clustering machine learning model and based at least in part on a group of initial historical input feature sets for the group of historical prediction input data objects, a plurality of input clusters; and generating the plurality of defined input profiles based at least in part on the plurality of input clusters.

11. The system of claim 10, wherein generating a defined input profile for the prediction input data object comprises:

determining a plurality of distance measures corresponding to the plurality of input clusters, wherein a distance measure of the plurality of distance measures indicates a distance from an initial historical input feature set for the prediction input data object to an initial historical input feature set of the plurality of input clusters; and generating the defined input profile based at least in part on the plurality of distance measures.

12. The system of claim 10, wherein the machine learning framework is trained based on a plurality of ground-truth scores, wherein a ground-truth score of the plurality of ground-truth scores is based on the group of historical prediction input data objects.

13. The system of claim 8, wherein:

the isolated embedding model comprises machine learning sub-models configured to generate a plurality of dimensional regression outputs for the prediction input data object, and a regression machine learning sub-model of the machine learning sub-models is configured to generate a dimensional regression output of the plurality of dimensional regression outputs based at least in part on a shared embedding feature set that is determined based at least in part on one or more embedding features for the prediction input data object.

14. The system of claim 13, wherein the isolated input embedding is generated based at least in part on the plurality of dimensional regression outputs.

15. One or more non-transitory computer-readable storage media including instructions that, when executed by one or more processors, cause the one or more processors to:

provide prediction input data object to a machine learning framework to receive a variable-output-space prediction, wherein the machine learning framework comprises:

(i) a multi-class classification machine learning model configured to generate a plurality of classification scores, respectively corresponding to a plurality of candidate predictive associations, based on an input vector corresponding to the prediction input data object and a plurality of candidate vectors respectively corresponding to the plurality of candidate predictive associations, (ii) an isolated embedding model configured to generate an isolated input embedding based on the input vector, (iii) a contextual embedding model configured to generate a contextual input embedding for the prediction input data object based at least in part on the isolated input embedding, wherein the contextual input embedding is generated based at least in part on a contextual input embedding subspace associated with a hypercube subspace geometric shape profile of a plurality of hypercube subspace geometric shape profiles, and (iv) a deep learning model configured to generate the variable-output-space prediction based on (a) a vector subset of the plurality of candidate vectors respectively corresponding to an association subset of the plurality of candidate predictive associations respectively associated with a score subset of the plurality of classification scores that meets or exceeds a threshold and (b) the contextual input embedding, wherein the multi-class classification machine learning model performs less computationally intensive operations than the deep learning model due to an input space of the contextual input embedding; and provide the variable-output-space prediction as an output of the machine learning framework.

16. The one or more non-transitory computer-readable storage media of claim 15, wherein a candidate predictive association feature set for a candidate predictive association of the plurality of candidate predictive associations comprises a historical engagement measure for the candidate predictive association with respect to a defined input profile.

17. The one or more non-transitory computer-readable storage media of claim 15, wherein the one or more processors are further caused to:

generate a plurality of defined input profiles by:

identifying a group of historical prediction input data objects;

generating, using an input clustering machine learning model and based at least in part on a group of initial historical input feature sets for the group of historical prediction input data objects, a plurality of input clusters; and generating the plurality of defined input profiles based at least in part on the plurality of input clusters.

18. The one or more non-transitory computer-readable storage media of claim 17, wherein generating a defined input profile for the prediction input data object comprises:

determining a plurality of distance measures corresponding to the plurality of input clusters, wherein a distance measure of the plurality of distance measures indicates a distance from an initial historical input feature set for the prediction input data object to an initial historical input feature set of the plurality of input clusters; and generating the defined input profile based at least in part on the plurality of distance measures.

19. The one or more non-transitory computer-readable storage media of claim 15, wherein:

the isolated embedding model comprises machine learning sub-models configured to generate a plurality of dimensional regression outputs for the prediction input data object, and a regression machine learning sub-model of the machine learning sub-models is configured to generate a dimensional regression output of the plurality of dimensional regression outputs based at least in part on a shared embedding feature set that is determined based at least in part on one or more embedding features for the prediction input data object.

20. The one or more non-transitory computer-readable storage media of claim 19, wherein the isolated input embedding is generated based at least in part on the plurality of dimensional regression outputs.

* * * * *